US010180887B1

(12) United States Patent
Bruce et al.

(10) Patent No.: US 10,180,887 B1
(45) Date of Patent: *Jan. 15, 2019

(54) ADAPTIVE POWER CYCLE SEQUENCES FOR DATA RECOVERY

(71) Applicant: BiTMICRO LLC, Reston, VA (US)

(72) Inventors: Rolando H. Bruce, South San Francisco, CA (US); Richard A. Cantong, Cabuyao Laguna (PH); Marizonne O. Fuentes, Leyte (PH)

(73) Assignee: BiTMICRO LLC, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/176,156

(22) Filed: Jun. 8, 2016

Related U.S. Application Data

(63) Continuation of application No. 13/253,912, filed on Oct. 5, 2011, now Pat. No. 9,372,755.

(51) Int. Cl.
| | | |
|---|---|---|
| *G06F 11/00* | (2006.01) | |
| *G06F 11/14* | (2006.01) | |
| *G06F 3/06* | (2006.01) | |
| *G06F 12/0804* | (2016.01) | |

(52) U.S. Cl.
CPC ........ *G06F 11/1471* (2013.01); *G06F 3/0619* (2013.01); *G06F 3/0652* (2013.01); *G06F 3/0653* (2013.01); *G06F 3/0673* (2013.01); *G06F 12/0804* (2013.01); *G06F 2201/805* (2013.01); *G06F 2201/82* (2013.01); *G06F 2201/85* (2013.01); *G06F 2212/1032* (2013.01)

(58) Field of Classification Search
CPC ............. G06F 11/1068; G06F 11/1438; G06F 12/023; G06F 12/0246; G06F 2212/7201; G06F 3/0619; G06F 3/0638; G06F 3/0652; G06F 3/0642; G06F 3/0604; G06F 3/0683; G06F 11/1471; G06F 3/0653; G06F 3/0673; G06F 12/0804; G06F 2211/1009; G06F 2211/1035; G06F 11/1441; G06F 2212/2022; G06F 12/0873
See application file for complete search history.

(56) References Cited

U.S. PATENT DOCUMENTS

| | | | |
|---|---|---|---|
| 4,402,040 A | 8/1983 | Evett | |
| 4,403,283 A | 9/1983 | Myntti et al. | |
| 4,752,871 A | 6/1988 | Sparks | |
| 4,967,344 A | 10/1990 | Scavezze et al. | |
| 5,111,058 A | 5/1992 | Martin | |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action for U.S. Appl. No. 13/475,878, dated Jun. 23, 2014.
(Continued)

*Primary Examiner* — Jason B Bryan
(74) *Attorney, Agent, or Firm* — Jackson Walker L.L.P.

(57) ABSTRACT

The present invention relates to an apparatus, method, and/or sequence that adaptively provide the recovery of data after a power cycle sequence, wherein only minimal updates are provided for control blocks associated with the data.

18 Claims, 14 Drawing Sheets

(56) References Cited

U.S. PATENT DOCUMENTS

| | | |
|---|---|---|
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,728,840 B1 | 4/2004 | Shatil |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischar et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,904,635 B2 | 3/2011 | Deng |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 4/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |

(56) References Cited

U.S. PATENT DOCUMENTS

| | | |
|---|---|---|
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0180065 A1* | 7/2010 | Cherian ............... G06F 12/0804 711/103 |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |

(56) References Cited

U.S. PATENT DOCUMENTS

| | | |
|---|---|---|
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pmeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0138905 A1 | 5/2013 | Wong et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
USPTO Notice of Allowability & attachment(s) dated Jan. 3, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 datedd May 11, 2012.
Notice of Allowability for U.S. Appl. No. 14/038,684 dated Aug. 1, 2014.
Office Action for U.S. Appl. No. 14/038,684 dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Office Action dated Sep. 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Office Action dated Dec. 5, 2014 for U.S. Appl. No. 14/038,684.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.

(56) References Cited

OTHER PUBLICATIONS

Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Advisory Action for U.S. Appl. No. 14/217,334 dated Jun. 13, 2016.
Office Action for U.S. Appl. No. 14/217,291 dated Jun. 15, 2016.
Office Action for U.S. Appl. No. 14/217,096 dated Jul. 12, 2016.
Notice of Allowance for U.S. Appl. No. 14/217,399 dated Jul. 20, 2016.
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Office Action for U.S. Appl. No. 14/216,937 dated Aug. 15, 2016.
Working Draft American National Standard Project T10/1601-D Information Technology Serial Attached SCSI-1.1 (SAS-1.1), Mar. 13, 2004 Revision 4.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/217,365 dated Oct. 18, 2016.
Office Action for U.S. Appl. No. 14/616,700 dated Oct. 20, 2016.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Advisory Action for U.S. Appl. No. 14/690,305 dated Nov. 25, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Robert Cooksey et al., A Stateless, Content-Directed Data Prefetching Mechanism, Copyright 2002 ACM.
Office Action for U.S. Appl. No. 14/866,946 dated Jul. 27 2017.
Office Action for U.S. Appl. No. 14/616,700 dated Jun. 2, 2017.
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.

* cited by examiner

FIG. 1
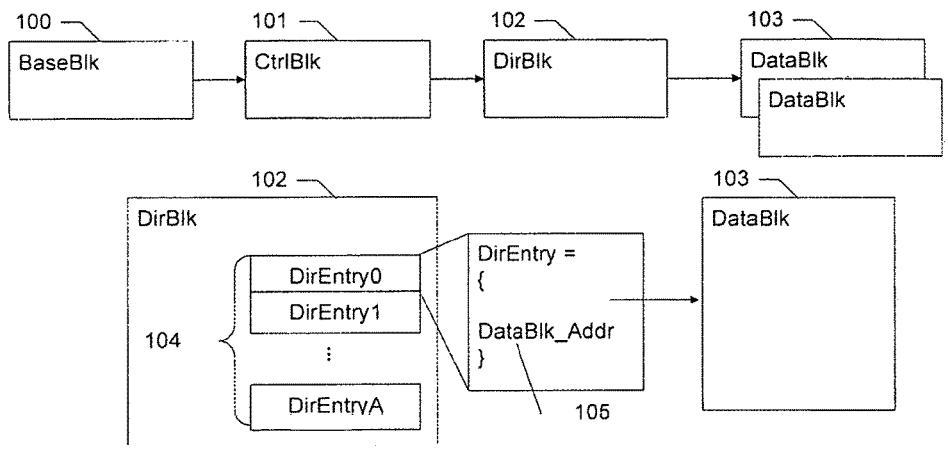
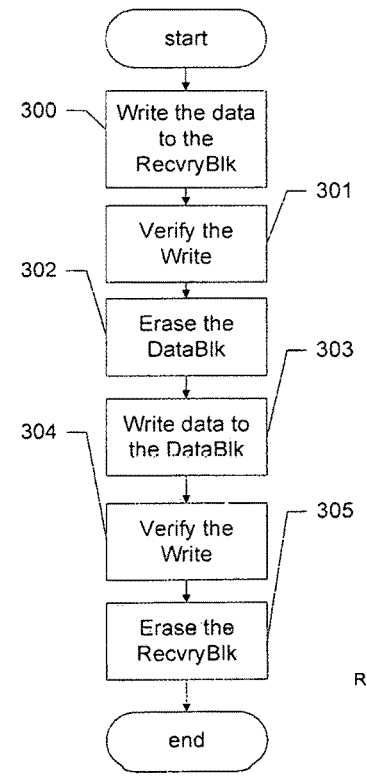
FIG. 3
Redundant Recovery Sequence
*Prior Art*

Free List in non-volatile memory = Free List in cache

BlkInfoDirBlk Power Cycle Recovery Sequence

DirBlk Power Cycle
Recovery Sequence

FreeList composition

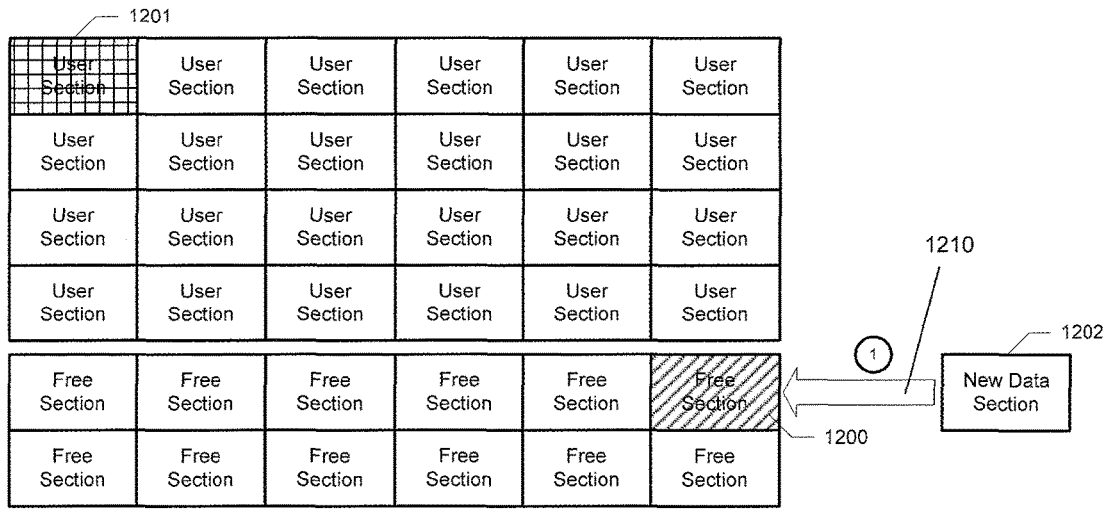
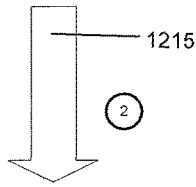
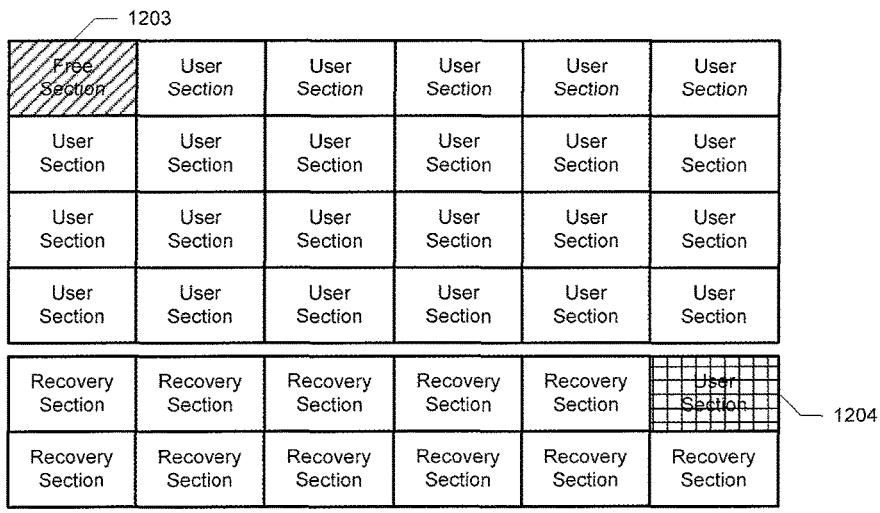
*FIG. 12*

Data Relocation: Update of Data Section to another location

ADAPTIVE POWER CYCLE SEQUENCES FOR DATA RECOVERY

This application is a continuation application of United States Application, entitled "Adaptive Power Cycle Sequences For Data Recovery", having a filing date of 5 Oct. 2011 and Ser. No. 13/253,912. Application Ser. No. 13/253,912 is hereby fully incorporated herein by reference.

BACKGROUND

(1) Technical Field

The present invention relates to computer storage systems, such as data storage devices that use data recovery.

(2) Description of Related Art

Typically, a storage system experiencing power failure at the middle of a process either acquires corrupted data or loses the data in a worst case scenario. The usual technique of easy data recovery is that upon data modification, the controls and directories associated to the data are also updated. This type of technique consumes relatively larger time and bandwidth. Consequently, there is a need for efficient power cycle sequences capable of data recovery.

The directory structure of a hybrid storage system is very hierarchical. This structure includes controls and directories arranged in a linked list manner. Constant updates of these directories are not only very time and bandwidth consuming but moreover, update synchronization is difficult considering the different directory levels that are contained in different memory blocks. Consequently, there is a need for sequences that are sufficiently adaptive to determine when these directories need to be updated and when the directories require no updates, thereby minimizing directory updates.

Normally, the control information is contained in the control blocks alone. Putting the controls in one block allows rebuilding of all directory structures, and this rebuilding even includes the rebuilding of unrelated information. This results in the wasting of time and bandwidth during the rebuilding process. Consequently, there is a need to achieve an improved and more efficient rebuilding of control data that has been corrupted.

SUMMARY

The present invention relates to an apparatus, method, and/or sequence that adaptively provide the recovery of data after a power cycle sequence, wherein only minimal updates are provided for control blocks associated with the data.

A power outage without notification can cause data corruption and/or data loss in storage systems. An example of such causes of data corruption is when at the middle of a system update process, an unexpected power failure occurs.

Embodiments of the invention further provide an apparatus, methods, and/or sequences which minimize data corruption and/or loss, and can recover the aforementioned corrupted and/or lost data by utilizing (i) data relocation, (ii) preventive safe sequence of data updates, and (iii) power cycle recovery sequence.

An embodiment of the invention advantageously separates some of the necessary information and places these necessary information in the data sections, so that only the corrupted control blocks related to the corrupted data are re-built.

In one embodiment of the invention, a method for data relocation includes: providing a free section in a free list block; obtaining an old physical block address (PBA) of an associated LBA of a used section that is currently storing old data; setting the old PBA of the used section equal to a displaced PBA of the free section; writing new data for the used section into the free section; and erasing the used section and changing the used section into a new free section. Another embodiment of the invention also provides an apparatus that can be configured to perform at least some of the above functionalities.

In another embodiment of the invention, a method for a power cycle recovery sequence, includes: providing, in a cache, a free list block comprising free list entries pointing to sections in a memory in a system; scanning the free list block to determine if each used free section is dirty, wherein a used free section that is dirty will require an update of a directory (DirBlk) and information directory block (BlkInfoDirBlk) that are associated with the used free section, and wherein each used free section stores user data; if a used free section is dirty, then performing a power cycle recovery sequence of the information directory block (BlkInfoDirBlk) and performing a power cycle recovery sequence of the directory (DirBlk); scanning each free section that is pointed by each free list entry; and if a free section is free, then performing a power cycle recovery sequence for the information directory block (BlkInfoDirBlk), and if the free section is not free, then erasing the free section. Another embodiment of the invention also provides an apparatus that can be configured to perform at least some of the above functionalities.

In another embodiment of the invention, a method of data relocation, includes: writing a new data to a free section, wherein the new data is for replacing old data in a current used section and wherein the new data includes a physical block address of the used section; determining if the new data in the free section is valid; if the new data is valid, converting the free section into the next used section with the physical block address of the current used section; and erasing the old data and converting the current used section into another free section. Another embodiment of the invention also provides an apparatus that can be configured to perform at least some of the above functionalities.

In another embodiment of the invention, a method for data recovery includes: in a power cycle recovery sequence, providing a minimal update for control blocks associated with data to be recovered. Another embodiment of the invention also provides an apparatus that can be configured to perform at least some of the above functionalities.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a block diagram of an example directory structure where the directory blocks hold the addresses of non-volatile memory blocks;

FIG. 3 is a flow diagram of a current recovery sequence method using the redundancy technique;

FIG. 12 is a block illustration of a data relocation, in accordance with a further embodiment of the invention;

DETAILED DESCRIPTION OF THE INVENTION

Figure 2:
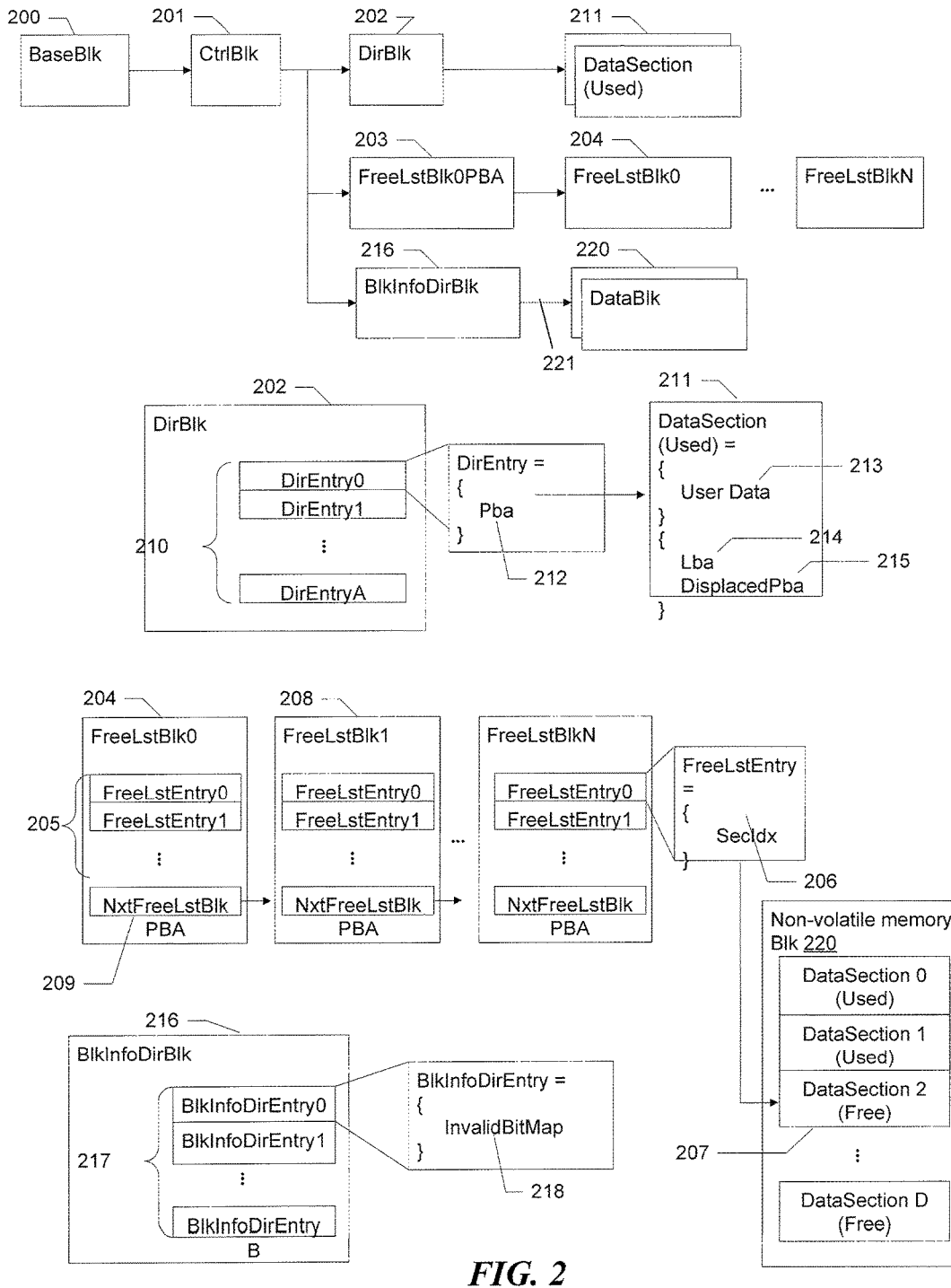
FIG. 2 is a block diagram of an example directory structure of a hybrid storage system where the directory blocks hold the addresses of non-volatile memory data sections.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

A power outage without notification can cause data corruption and/or data loss in storage systems. Usually this problem is solved by an immediate update of control blocks associated with the modified data. However, this solution is time and bandwidth consuming especially in cases when the data is frequently overwritten. As will be discussed below, embodiments of the invention provide adaptive sequences or methods capable of data recovery after a power cycle sequence and involving only minimal updates of control blocks associated to the modified data.

For small end storage system, the directory structure is less complex compared to that in the hybrid storage system. FIG. 1 is a block diagram that illustrates an example of a directory structure for a small end storage system. Base block (BaseBLk) 100 contains the address of the control block (CtrlBlk) 101 which stores information such as the directories 102 (alternatively referred herein as "directory blocks 102") holding addresses for data blocks 103. The data blocks 103 are typically non-volatile memory blocks. Each directory block (DirBlk) 102 contains entries 104 which, per entry, hold the data block addresses 105 for the data blocks 103 in a non-volatile memory. A particular data block address 105 is associated with a respective data block 103.

In comparison with that of the directory structure in FIG. 1, FIG. 2 is a block diagram that illustrates a modular and hierarchal directory structure which is efficient for a high-end, fast, hybrid storage system. The base block (BaseBlk) 200 contains pointers that point to a control block (CtrlBlk) 201. The CtrlBlk 201 contains pointers that point to a directory block (DirBlk) 202 and a free list block physical block address (FreeLstBlk0PBA) 203. The level (or number) of directory blocks can be one (1) or more, depending on the size of the storage system (also referred herein as "system"). The directory blocks 202 hold the addresses of non-volatile memory data sections 211. As described below in additional details, a data section can shift in the state from being a used data section to being a free data section, and vice versa. In the example of FIG. 2, a used data section 211 is in a data block 220 which can be, for example, a memory block in a non-volatile memory device. A non-volatile memory device can be, for example, a flashchip (i.e., flash memory device) or another suitable type of memory device. The term "flashchip" or "flash memory device" is intended to include any form of non-volatile solid-state memory, including those that use blocks of non-volatile memory cells, named flash blocks. Each memory cell (not shown) may be single or multi-level. Flash memory devices are known by those of ordinary skill in the art. A flash memory device permits memory operations, such as a write or read operation, to be performed on these flash blocks according to a protocol supported by the flash memory device. A flash memory device may be implemented by using a NAND flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash memory device that complies with the ONFI Specification is not intended to limit the embodiment(s) disclosed. One of ordinary skill in the art having the benefit of this disclosure would readily recognize that other types of flash memory devices employing different device interface protocols may be used, such as protocols compatible with the standards created through the Non-Volatile Memory Host Controller Interface ("NVMHCI") working group. Members of the NVMHCI working group include Intel Corporation of Santa Clara, Calif., Dell Inc. of Round Rock, Tex. and Microsoft Corporation of Redmond, Wash.

The free list block physical block address (FreeLstBlk0PBA) 203 holds the physical block address (PBA) of the free list block 0 (FreeLstBlk0) 204 which is the first memory block in the chain holding the list of all non-volatile memory blocks with free sections in the system. In FIG. 2, this chain has the following example free list blocks (FreeLstBlk0 through FreeLstBlkN) where N is any suitable integer number depending on the memory size available in the system. A section 211 (or "data section" 211) is defined to be the smallest logical allocation unit in the memory which can be relocated independently. The sections can span (can be distributed among) one or more non-volatile memory device 1410 (FIG. 14), or can span one or more non-volatile memory block 220. In the example of FIG. 2, the non-volatile memory block 220 is currently shown as including the used DataSection_0, used DataSection_1, and free DataSection_2 through free DataSection_D. The system can store user data within the data sections in a single memory block 220, within data sections that is distributed among multiple memory blocks 220, within data sections that are distributed among multiple non-volatile memory devices 1410 (FIG. 14), and/or by another suitable method that stores the user data in multiple memory areas. Additionally, the terms "block" or "memory block" can also mean a section, a memory page, a flashchip block, or another type of addressable non-volatile memory area. Therefore, the terms "block" or "memory block" is not limited to just a flashchip block. A section is in its free state (i.e., a section is a "free section" or "free data section") if the section is not associated with any logical block address (LBA) but can be associated anytime with an LBA. A section is in its used state (i.e., a section is a "used section" or "used data section") if the section is already associated to an LBA. A free list block (e.g., free list block 204) is a non-volatile memory block holding a free section (free data section) in the system. As shown in FIG. 2, each non-volatile memory block 220 can have both used sections 211 and free sections 207.

The details of the FreeLstBlk structure (e.g., FreeLstBlk0 204) are also shown in FIG. 2. The FreeLstBlk structure holds the array of free list entries 205 (e.g., FreeLstEntry0, FreeLstEntry1, and other entries) for all the non-volatile memory blocks 220 with free sections present in the whole system. Each free list entry (FreeLstEntry) holds the section index (SecIdx) 206 that points to the free section 207 which is shown as example free data section 2 (see, "DataSection 2") currently in the non-volatile memory block 220 (DataBlk 220) in FIG. 2. Another example free section currently in the memory block 220 is free data section D (see, "DataSection D"). These free list blocks are chained by pointers (i.e., free list block 1 208 is pointed to by next free list block physical block address (NxtFreeLstBlkPBA) 209 and so on until all the non-volatile blocks are covered.

The DirBlk 202 structure holds the array of directory entries 210 for a plurality of used data sections 211. In the example of FIG. 2, the used data sections 211 are currently used data section 0 ("DataSection 0") and used data section 1 ("DataSection 1") in the memory block 220. Each directory entry (DirEntry) contains the PBA (physical block address) 212 of its associated used data section 211. As mentioned above, a section is in its used state if the section is already associated to an LBA (logical block address). Every used section 211 includes its user data 213, its associated LBA 214, and a displaced PBA 215 which is the PBA of the last data section associated to the LBA 214. If directory level 1 is not enough to accommodate the total number of used data sections, a higher level can be created to accommodate the other used data sections.

The control block 201 also contains a pointer that point to an information directory block (BlkInfoDirBlk) 216. This information directory block (BlkInfoDirBlk) 216 holds the array of information entries (BlkInfoDirEntry) 217 for all the non-volatile memory blocks present in the whole system. Each entry (BlkInfoDirEntry) holds an invalid bit map (InvalidBitMap) 218 that flags whether a data section is invalid or not. A data section is in its invalid state if it is not associated to any LBA but has to be erased first before the data section can be associated with an LBA. The DataSections can be in a single non-volatile memory Blk 220 (as shown in FIG. 2) or the DataSections can span (e.g., can be distributed among) multiple Blocks 220, and/or the DataSections can span multiple non-volatile memory devices (e.g., multiple memory devices 1410 in FIG. 14), so that the system can store the user data among multiple memory areas as needed for purposes of increased storage efficiency and performance. It is also noted that the dashed arrow 221 from BlkInfoDirBlk 216 to DataBlks 220 does not represent not an actual pointer to DataBlks 220. This dashed arrow 221 instead indicates that the BlkInfoDirBlk 216 contains the various information or status of the DataBlks 220 as will be discussed below.

The importance of separating the information describing the status of the DirBlk (i.e., the presence of BlkInfoDirBlk) allows the separation of updates for each block. This separation advantageously minimizes the unwanted updates for unnecessary data, as will be discussed below, in accordance with one or more embodiments of the invention.

For the directory structure of FIG. 1, the smallest unit that a directory entry holds is one block which allows a simple data recovery sequence to be implemented as illustrated in FIG. 3. In FIG. 3, there is shown a flow diagram of a current recovery sequence method using the redundancy technique. Additional details of the recovery sequence of FIG. 3 are also described in commonly-owned and commonly-assigned U.S. Pat. No. 6,970,890. In this method, the data is first written to the recovery block (RecvryBlk) in task 300. After the write is performed, in task 301 the data is verified if there are no errors. Since the data is written to same memory block, in task 302 the memory block is first erased prior to any updates. In the event of a power loss when or after the memory block is erased, the data remains saved in the recovery block. If the memory block is already clean, the data (from the recovery block) is now written to the memory block (DataBlk) in task 303. The written data in the memory block is verified if it is error-free in task 304. Finally, in task 305 the recovery block is erased in preparation for its future use in updates as similarly described in task 300 and subsequent tasks in FIG. 3. In this technique of recovery sequence, if used solely in the directory structure of FIG. 2, the following issues will arise: (1) time consuming (latency), (2) bandwidth consuming, (3) difficulty in directory synchronization. These issues are due to a "domino effect" penalty as the result of the hierarchical nature (or tree structure) of the directory. For example, if an update is performed in a particular block level of the directory structure, an update is also required for higher block levels in the directory structure so that coherency or synchronization is maintained with other parts of the directory structure that relies on the performed update. Therefore, it would be advantageous to reduce the latency and other issues that are imposed by the tree structure of the directory. Embodiments of the present invention solve these issues as illustrated in FIGS. 4A and 4B and as discussed below.

Figure 4A:
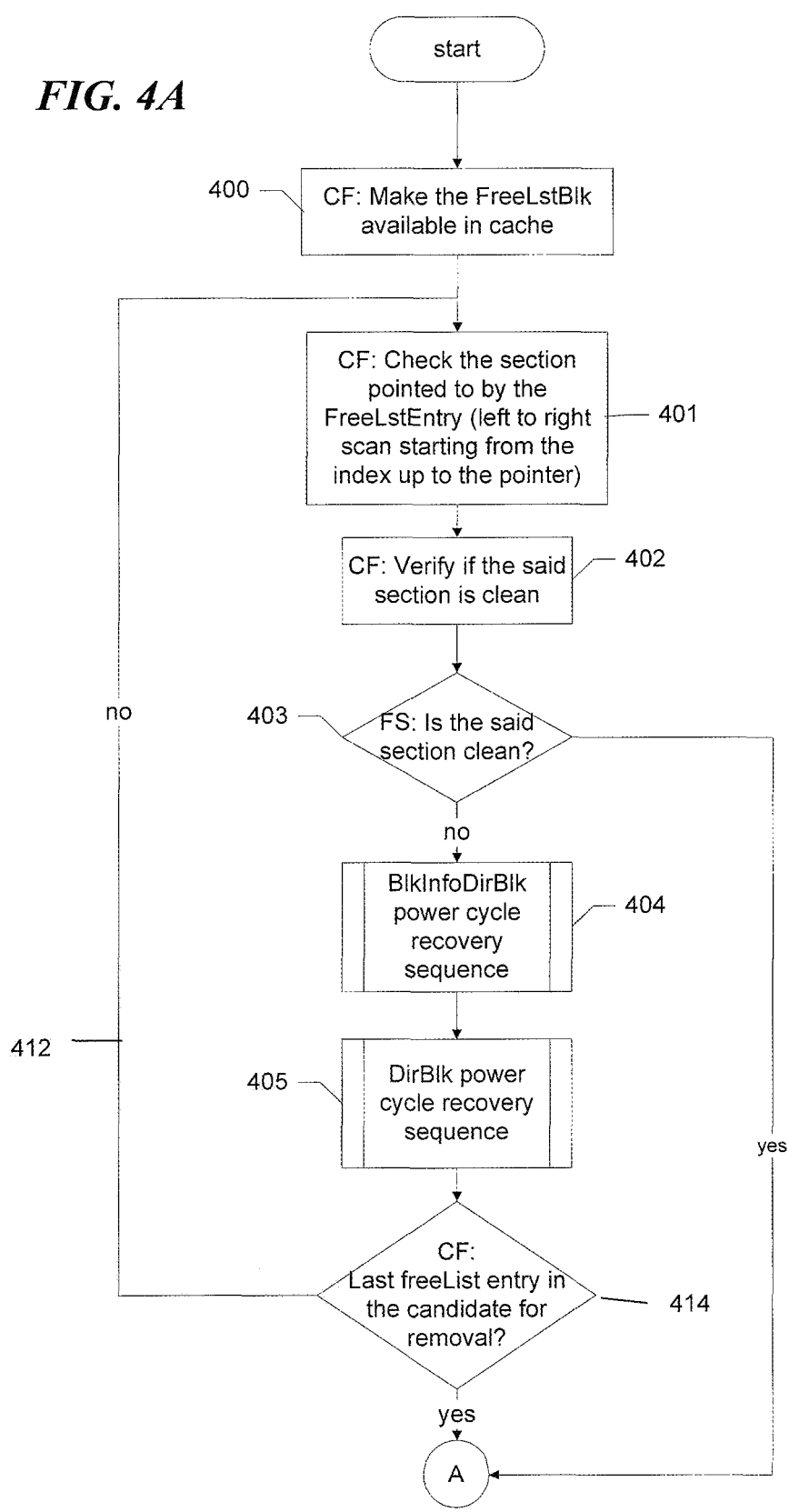
FIGS. 4A and 4B are flow diagrams that illustrate a power cycle recovery sequence in accordance with one embodiment of the present invention.
Figure 4B:
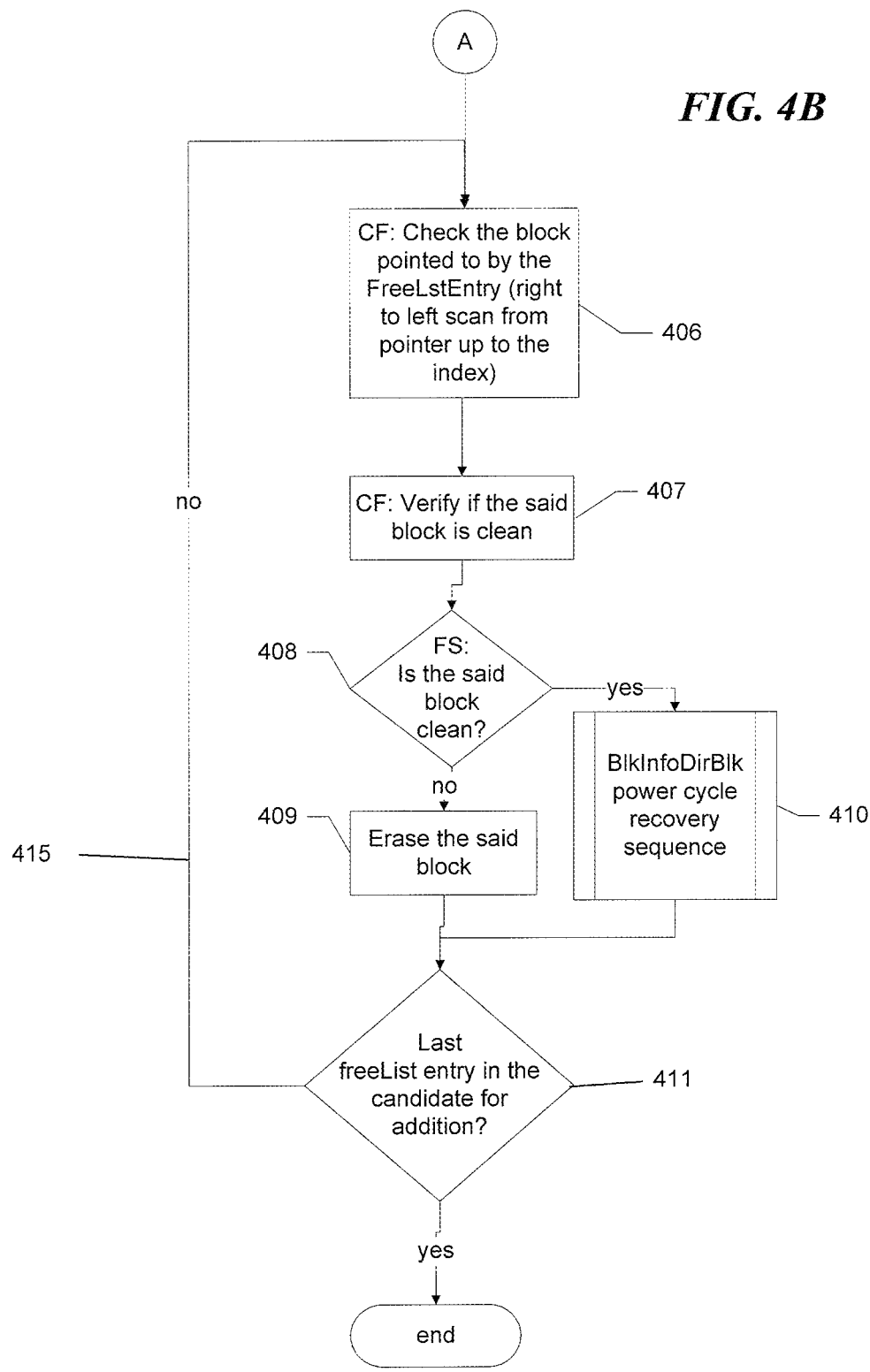
Figure 5:
FIG. 5 is a block diagram of a layout of section indices pointing to free sections in the non-volatile memory relative to cache, in accordance with another embodiment of the invention.

Reference is now made to FIGS. 4A, 4B, and 5. FIGS. 4A and 4B are flow diagrams that illustrate a power cycle recovery sequence in accordance with one embodiment of the present invention. FIG. 5 is a block diagram of a layout of section indices pointing to free sections in the nonvolatile memory relative to cache, in accordance with one embodiment of the invention. The major blocks involved in this power cycle recovery sequence of FIGS. 4A-4B includes the following: BlkInfoDirBlk 216 (see FIG. 2), DirBlk 202, and FreeLstBlk (e.g., the free list blocks in the chain that begins with the example free list block 204 in FIG. 2 and shown as example free list block 500 in FIG. 5). As shown in some of the various tasks in FIGS. 4A-4B, the legend "CF" means cache free list (i.e., a free list entry in a volatile memory such as, for example, a cache 1408 in FIG. 14 or another type of volatile memory device), and the legend "FS" means non-volatile memory section or flashchip section (i.e., a data section in a non-volatile memory such as, for example, the memory 1410 in FIG. 14 or another type of non-volatile memory device). When the term "cache" is used herein, it is understood by those skilled in the art that this term can also mean another suitable type of volatile memory device. When the term "flashchip" is used herein, it is understood by those skilled in the art that this term can also mean another suitable type of non-volatile memory device. In an embodiment, the memory 1410 can also be a memory array having multiple non-volatile memory devices. This power cycle recovery sequence happens during initialization when the system obtains power after a power interruption. The recovery of the BlkInfoDirBlk (block 216) and DirBlk (block 202) are dependent on the FreeLstBlk block, so that the aforementioned FreeLstBlk 500 should be made available in cache in task 400 (FIG. 4A). When the free list block 500 is made available in cache, this free list block 500 will mirror (is equal to) the corresponding free list block 500 in the non-volatile memory. This FreeLstBlk 500 was also referred to as FreeLstBlk 204 in the above discussion relating to FIG. 2.

Each FreeLstBlk contains an index (I) 501 (FIG. 5) and pointer 502. The free list entries ("F" or FreeLstEntry) of the FreeLstBlk 500 are scanned 510 starting from the entry pointed to by the index 501 (left to right) up to the pointer 502 of used free list entries, as shown in FIG. 5. The system performs this scanning procedure. For example, in FIG. 5, the FreeLstBlk 500 points to sixteen (16) free list entries (free list entries 0 through 15). The system scans these free list entries F in a volatile memory 1408 (e.g., a cache). Each of the free list entries F is associated to a free section in the non-volatile memory 1410 (e.g., a flashchip). As an example, the free list entry (FreeLstEntry0) is associated with the free section 207 as shown in FIG. 2. Assuming during the start up of power, there are, for example, twelve (12) used free sections 503 (shown as blocks F with diagonal hash marks) so that the twelve (12) used free list entries (entries 0 through 11) are candidates for removal in the free list. The system checks the aforementioned respective used free sections pointed to by each of the corresponding twelve (12) candidates 503 by scanning the aforementioned FreeLstBlk 500 in task 401. Specifically, in task 401, the system checks each respective used free section that are pointed to by a corresponding free list entry in the twelve free list entries, by a left-to-right scan 510, starting from the index 501 and up to the pointer 502.

The system further verifies if the particular used free section (associated with one of the used free list entries 0 through 11) is actually free (pre-erased or clean) in task 402. If the particular used free section is dirty (not clean or not pre-erased) in task 403, this means that the BlkInfoDirBlk (information directory block) and the DirBlk (directory block) saved in the non-volatile memory associated with that particular used free section (also in the non-volatile memory) needs to be updated because that particular used section is dirty (i.e., contains user data). This update is performed in Task 404 and Task 405. Task 404 illustrates the power cycle recovery sequence for updating the BlkInfoDirBlk and is shown in additional details in FIG. 6 below. Task 405 illustrates the power cycle recovery sequence for updating the DirBlk and is shown in additional details in FIG. 7 below.

Task 414 checks for the next free list entry among the candidates for removal, and the tasks 401 through 405 are repeated in loop 412 for the next free list entry among the candidates for removal until the last free list entry that is a candidate for removal has been processed by the tasks that start at task 401.

After the last free list entry that is a candidate for removal (from free list block 500) has been processed by the tasks that starts at task 401 (or if a particular used free section is clean in task 403), then the sequence proceeds to the tasks in FIG. 4B.

As mentioned above, the Tasks 401 to 405 in FIG. 4A loops until all the free list entries that are candidates for removal are determined. After the loop 412 (FIG. 4A) is completed, the system proceeds to the scanning 511 of the FreeLstBlk from the pointer 502 up to the free list entry pointed to by the index 501 (right to left) until it is determined or proven that the FreeLstEntries are proven to be clean as shown in FIG. 5. For example, in FIG. 5, after the FreeLstEntries 503 that are candidates for removal were replaced with the new set of free sections 504 pointed to by FreeLstEntries, the system checks the free section pointed to by the FreeLstEntry in task 406. Then in task 407, the system verifies if the free section 504 is indeed clean or erased. The system performs the task 407 for all free sections pointed to by all the FreeLstEntries F in order to make sure that FreeLstBlk 500 contains FreeLstEntries F that all points to only clean/erased free sections in non-volatile memory. If the free section 504 (in non-volatile memory) turns out to be dirty in task 408, the system erases the aforementioned free section (in non-volatile memory) in task 409 so that this free section pointed to by the FreeLstEntry F (added to free list block 500) is clean/erased (i.e., will have no user data and is not associated to an LBA); otherwise, the BlkInfoDirBlk power cycle recovery sequence of FIG. 6 is again executed in task 410. Tasks 406 through 410 loops until the section pointed to by the FreeListEntry is proven to be clean. The system then exits this process.

Reference is now again made to FIG. 4B for purposes of an additional detailed discussion. In task 406, the system checks the free section 504 that is pointed to by the particular FreeLstEntry, by performing a right to left scan 511 from the pointer 501 (FIG. 5) to the index 502. The system performs Task 406 after the FreeLstEntries 503 (FIG. 5) that are candidates for removal were replaced 512 (FIG. 5) with the new set of free sections 504 (FIG. 5) pointed to by FreeLstEntries.

In task 407, the system verifies if an aforementioned free section 504 is indeed clean (erased). In task 408, if the aforementioned free section 504 is clean, the system again executes the power cycle recovery sequence for the BlkInfoDirBlk (of FIG. 6) in task 410 and proceeds to task 411. Tasks 406 through 410 will loop 415 until the free section 504 pointed to by the FreeListEntry is proven to be clean. The system then exits this process after task 411 determines that the last free list entry in the candidates 504 for addition to the free list block 500 have been checked in task 406 through task 410.

If, in task 408, the aforementioned free section 504 is not clean (i.e., is dirty), then the system erases the aforementioned free section 504 in task 409 so that the free section 504 is clean in non-volatile memory.

Figure 6:
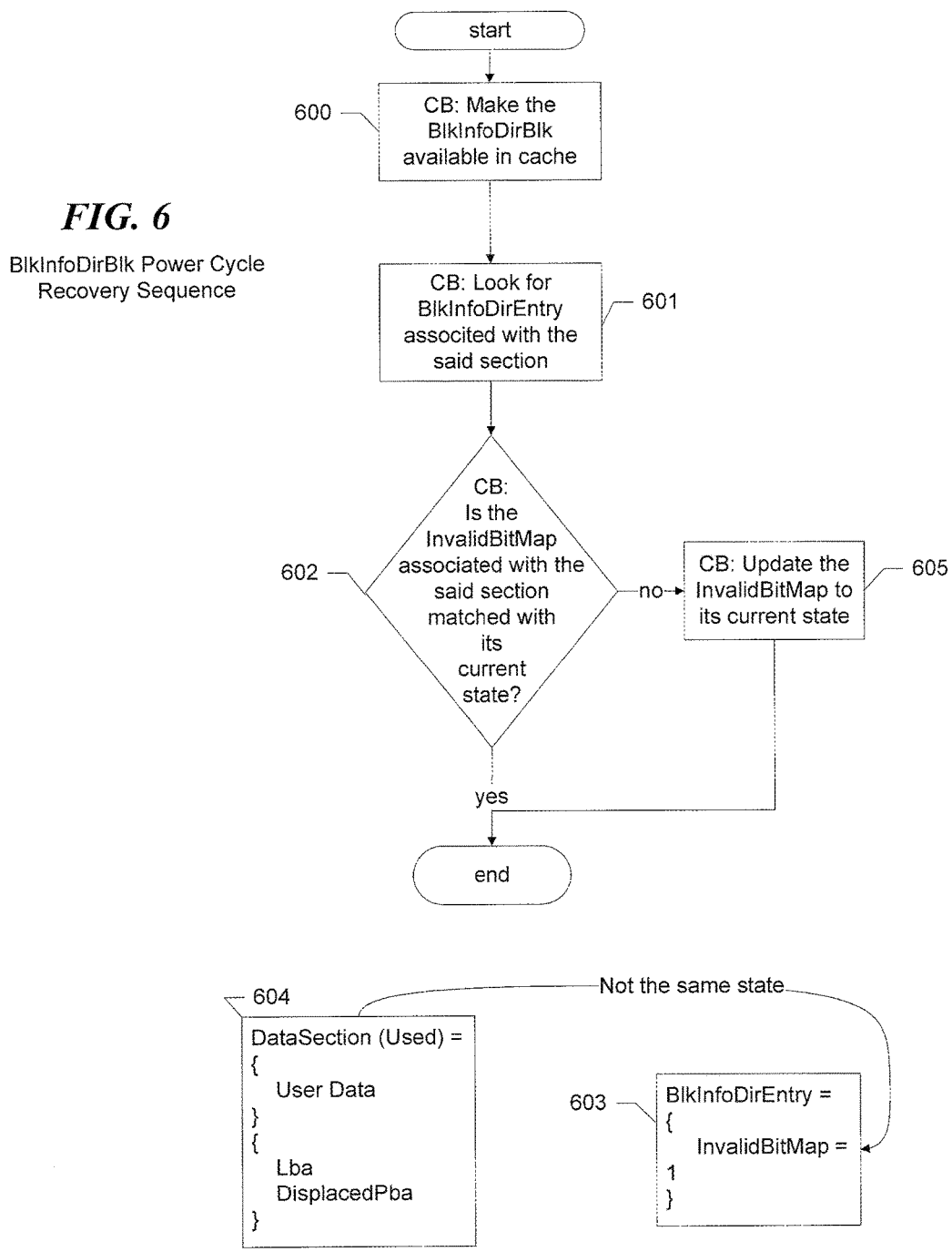
FIG. 6 is a flow diagram of the power cycle recovery sequence for updating a BlkInfoDirBlk, in accordance with yet another embodiment of the invention.

Reference is now made to both FIG. 2 and FIG. 6. FIG. 6 is a flow diagram of the power cycle recovery sequence for updating a BlkInfoDirBlk (e.g., block 216 in FIG. 2), in accordance with one embodiment of the invention. As mentioned above, if a particular used free section 604 is dirty (not clean) (see Task 403), this means that the BlkInfoDirBlk and the DirBlk blocks saved in the non-volatile memory associated to that particular used free section 604 (also in the non-volatile memory) needs to be updated. FIG. 6 shows the update for the BlkInfoDirBlk (information directory block) during a power cycle recovery sequence, while FIG. 7 shows the update for DirBlk (directory block) during a power cycle recovery sequence.

As stated above, if the used free section is dirty Task 403, then the information directory block (BlkInfoDirBlk) saved in non-volatile memory associated with that used free section is updated or is verified as updated with the Task 410 shown in FIG. 6. Additionally, if a free section 504 (FIG. 5) (added to the free list block 500) is clean in Task 408, then the BlkInfoDirBlk saved in non-volatile memory associated with that added free section 504 is updated or is verified as updated with the Task 410 shown in FIG. 6. In FIG. 6, the BlkInfoDirBlk 216 (FIG. 2) associated for the aforementioned used free section 604 is made available in cache in task 600 (FIG. 6). In FIG. 6, the legend "CB" means cache block information or volatile memory block information (i.e., BlkInfoDirBlk in volatile memory such as, for example, a cache). As similarly discussed above, this aforementioned used free section 604 is pointed to by one of the free list entries F that are candidates 503 (FIG. 5) for removal in the list. The system then looks for the BlkInfoDirEntry associated with the aforementioned used free section 604 in task 601. As discussed above, the BlkInfoDirEntry is an entry 217 in the BlkInfoDirBlk 216 (FIG. 2).

The InvalidBitMap flag 603 is associated with the aforementioned used free section 604 and is in the BlkInfoDirEntry. The system then checks, in task 602, if the InvalidBitMap flag 603 is not set because the aforementioned used free section 604 is in its used state. If the InvalidBitMap flag 603 is not in same state with that of the aforementioned used free section 604, the InvalidBitMap flag 603 is set (updated) to "0" in task 605, so that the flag 603 is updated to the current state which is the used state. The system then exits this process and returns to the main program of FIG. 4A. In task 602, if the InvalidBitMap flag 603 is in same state (used state) with that of the aforementioned used free section 604, then this condition means that the BlkInfoDirEntry has previously been updated and no update is required for the BlkInfoDirBlk associated with the used free section 604. When the BlkInfoDirEntry has previously been updated, then the process exits and returns to the main program of FIG. 4A. Therefore, the process in FIG. 6 is performed to update the BlkInfoDirBlk associated with the used free section 604 if this update is needed, or is performed to verify the previous update of that BlkInfoDirBlk.

Figure 7:
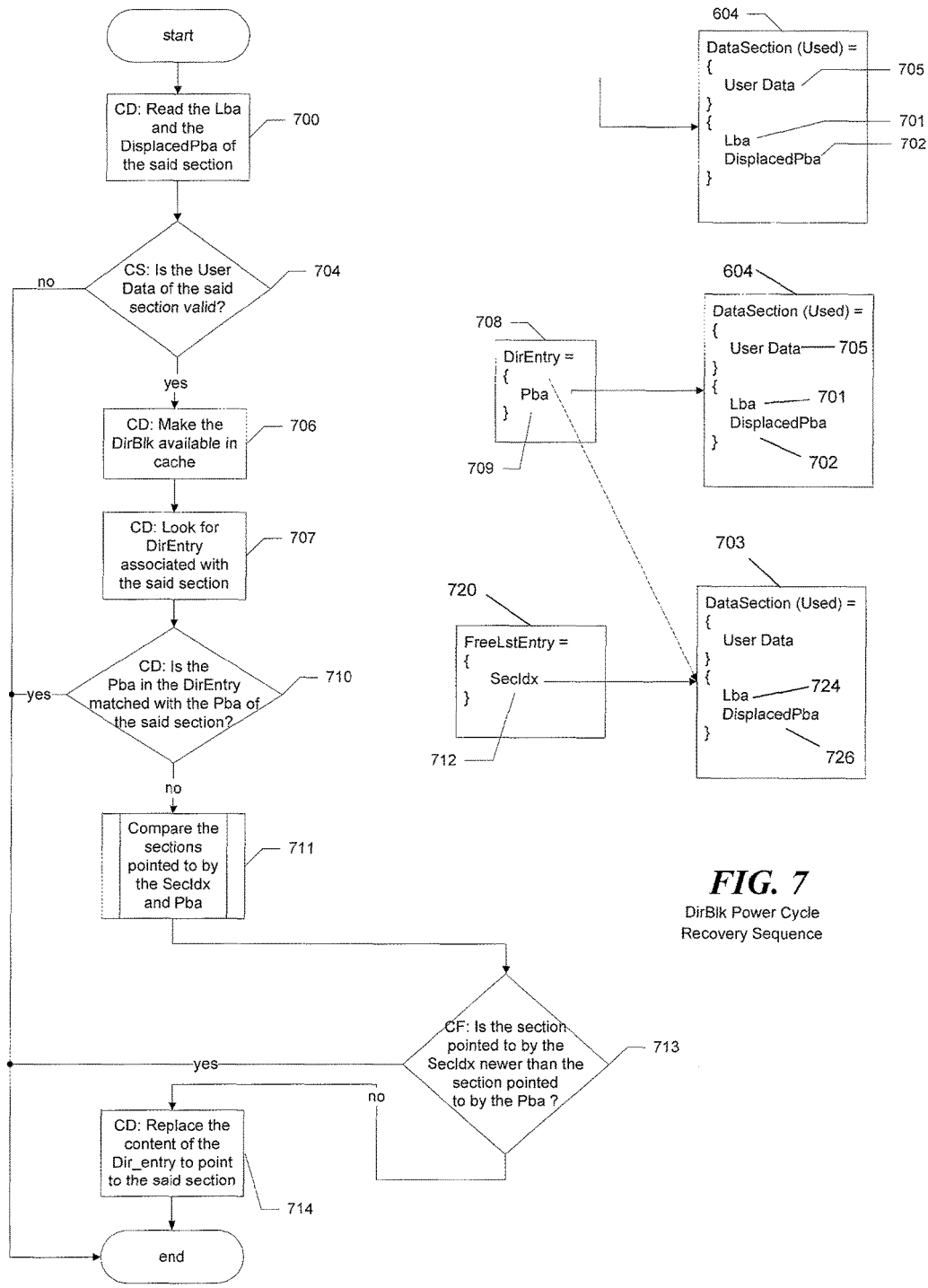
FIG. 7 is a flow diagram of the power cycle recovery sequence for updating a DirBlk, in accordance with a further embodiment of the invention.

FIG. 7 is a flow diagram of the power cycle recovery sequence for updating a DirBlk, in accordance with one embodiment of the invention. In FIG. 7, the legend "CD" means cache directory or volatile memory directory (i.e., directory in volatile memory), the legend "CS" means cache section or volatile memory section (i.e., data section in volatile memory), and the legend "CF" means cache free list entry or volatile memory free list entry (i.e., free list entry in volatile memory). If a particular used free section is dirty (see Task 403) and after the power cycle recovery sequence for the BlkInfoDirBlk is performed (FIG. 6), the sequence for DirBlk is executed in order to perform an update on the DirBlk if needed. FIG. 7 details the DirBlk power cycle sequence. First in task 700, the system reads, from a DirBlk in volatile memory (e.g., a cache), the logical block address (Lba) 701 and the displaced physical block address (DisplacedPba) 702 in the aforementioned used free section 604 (which also shown in FIG. 6) that is dirty. As discussed above with reference to FIG. 2, a directory entry (DirEntry) in a DirBlk 202 points to a used free section 211 which contains an Lba and a DisplacedPba, where the DisplacedPba is the PBA of the last data section associated to the Lba.

Then in task 704, the system checks if the User Data 705 (of the used free section 604) is error free (valid). If the user data 705 turns out to be invalid, the system exits this process and returns to the main program in FIG. 4A without updating the DirBlk.

An invalid user data 705 indicates that the writing of the user data (into the used free section 604) was not yet finished when system power interruption occurred, and as a result the DirBlk associated with the used free section 604 is not updated. Otherwise, the system makes available the DirBlk associated to the aforementioned used free section 604 in cache, as shown in task 706.

In task 707, the system looks (searches) for the DirEntry 708 which is associated with the used free section 604. The system then reads the Pba 709 of the DirEntry 708. In task 710, the system checks whether the Pba 709 is matched with the associated Pba of the Lba 701 of the used free section 604. If the above physical block addresses (Pbas) are matched, this means that the DirBlk (associated with the used free section 604) in the non-volatile memory is already updated and the system exits this process and returns to the main program in FIG. 4A. Otherwise, if the above Pbas do not match in task 710, then in task 711 the system compares the used free section pointed to by the used free section index (SecIdx) 712 in the FreeLstEntry 720 and the used free section pointed to by Pba 709. As shown in FIG. 2 and FIG. 5, the section index is contained in a free list entry in a free list block. If, in task 713, the section pointed to by the SecIdx 712 is newer than the section pointed to by the Pba 709, then this means that the aforementioned DirBlk is updated and the system exits this process. Otherwise, if the section pointed to by the SecIdx 712 is not newer than the section pointed to by the Pba 709, then the system executes the task 714 where the system replaces the Pba 709 content of the DirEntry 708 with the SecIdx 712 so that the Pba 709 points to the section pointed to by SecIdx 712. The PBA 709 content in the DirEntry 708 (FIG. 7) needs to be replaced because the system has determined that the PBA 709 content is old. The PBA 709 content is required to be replaced by a new PBA content which comes from the PBA in the current FreeList Section index (SecIdx) 712 which the system is scanning in the cache. The SecIdx 712 does not point to an older section and it points to a newer section than the section being pointed to by the PBA 709 content.

Figure 8:
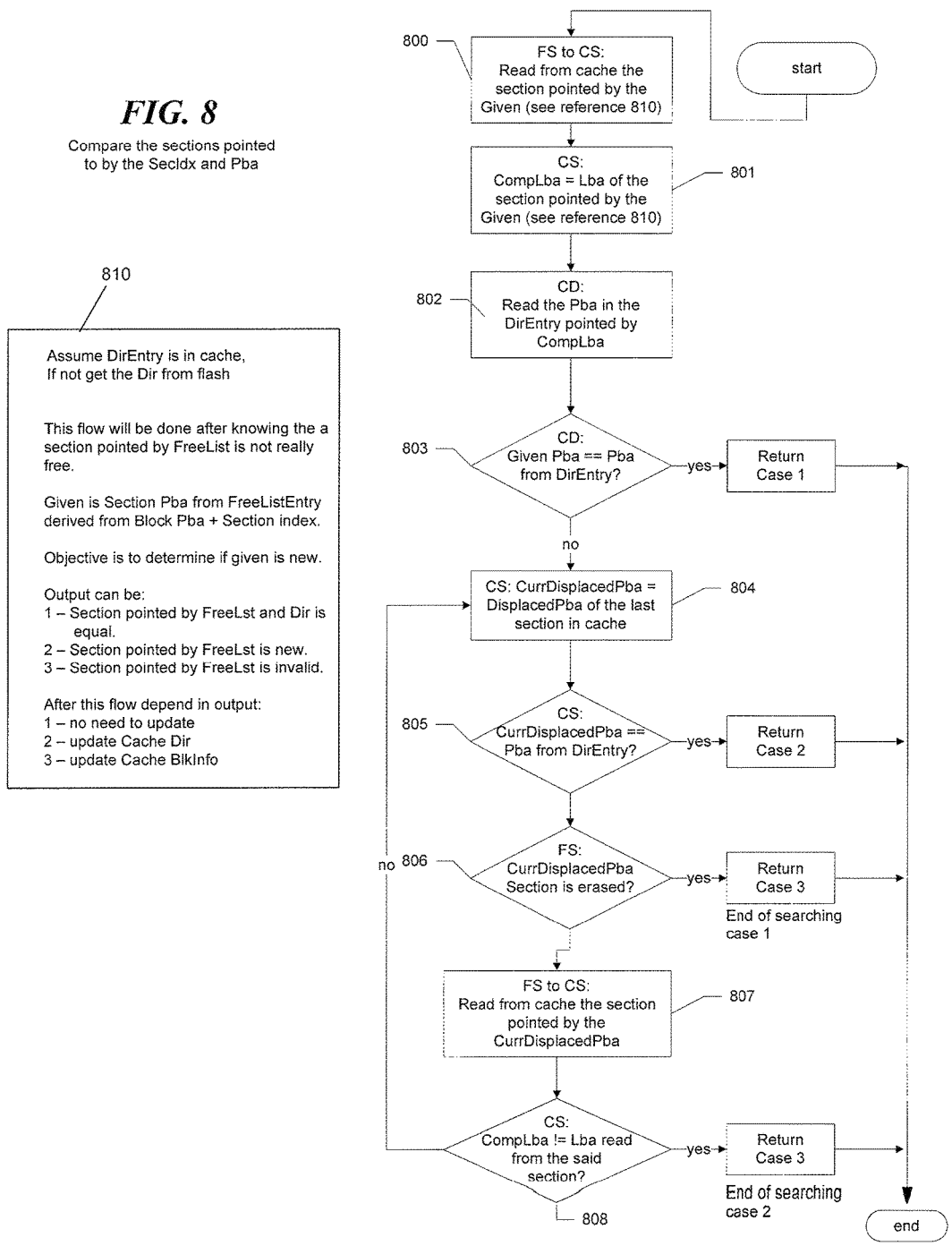
FIG. 8 is a flow diagram of a method of comparison between physical block address, in accordance with a further embodiment of the invention.

FIG. 8 is a flow diagram of a method of comparison between physical block address, in accordance with one embodiment of the invention. The legend "FS to CS" in FIG. 8 means the system will read from a non-volatile memory section (e.g., flashchip section) and then the content is written to the volatile memory section (e.g., cache section). Also, prior to the start of Task 800, the DirEntry is already stored in volatile memory (e.g., cache). If the DirEntry is not yet in the volatile memory prior to the start of Task 800, then the system will read the DirEntry from the non-volatile memory (e.g., flashchip) to obtain the DirEntry content. This method provides the details of the task 713 of FIG. 7, to compare the sections pointed to by the SecIdx 712 and Pba 709. This task 713 is usually performed after determining that the aforementioned used free section 703 (FIG. 7) pointed to by the SecIdx 712 (in the FreeLstEntry 720) is not actually free. Moreover, this task 713 determines if the aforementioned pointed section 703 is newer compared to that of the section 604 (FIG. 7) pointed by the DirEntry 708. In other words, the system determines if the section Pba from the FreeLstEntry 720 (as derived from the non-volatile memory block Pba and section index 712) is new. There are three possible outputs as illustrated in the three cases shown in FIG. 9. The three outputs can be: (1) if the section pointed by the FreeLstEntry and by the DirEntry is equal, then there is no need to update the DirBlk; (2) if the section pointed by the FreeLstEntry is new, then the system updates the DirBlk; and (3) if the section pointed by the FreeLstEntry is invalid, then the system updates the BlkInfoDirBlk.

Figure 9:
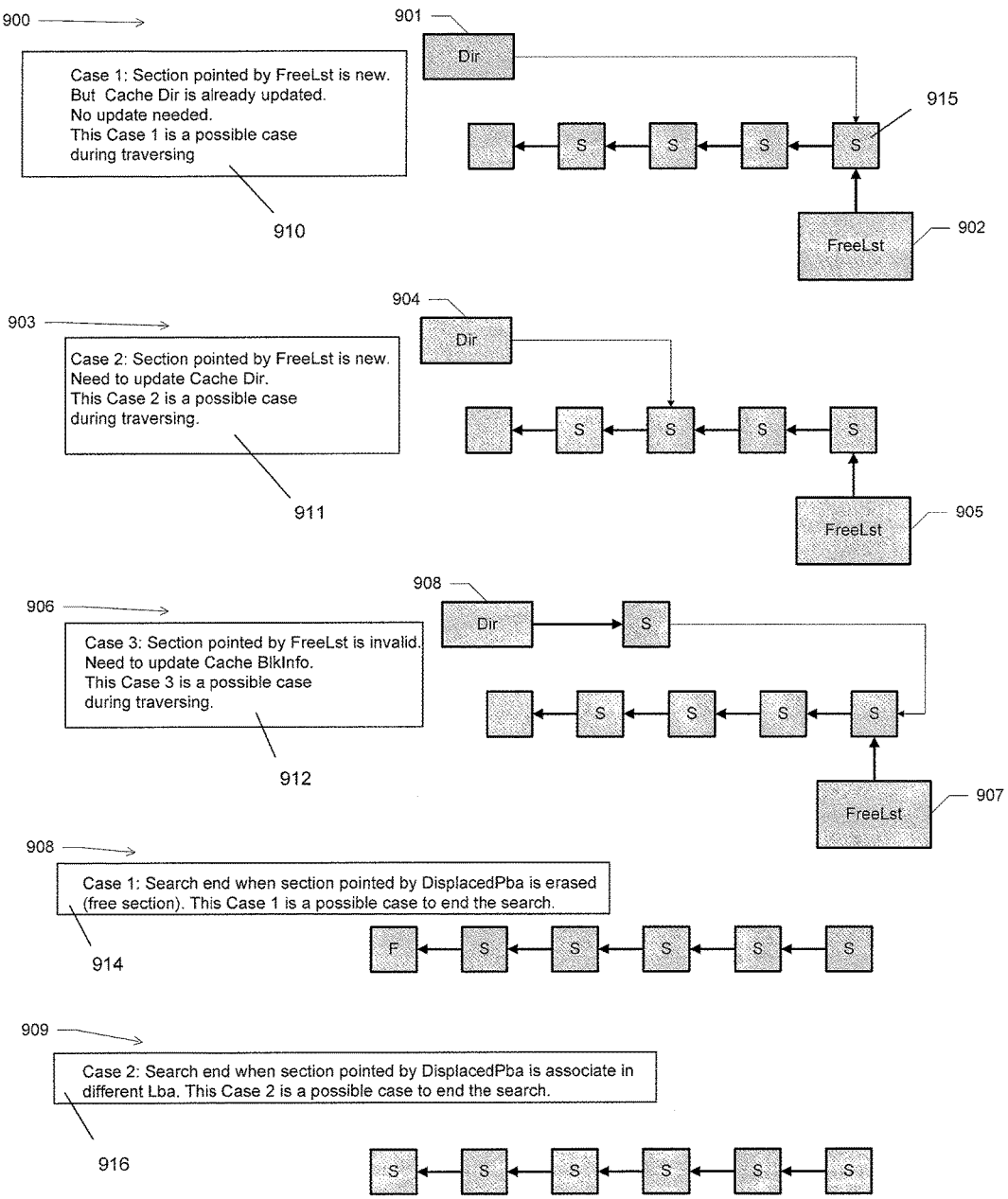
FIG. 9 is a block diagram illustrating the different cases of when to update the BlkInfoDirBlk and the DirBlk, in accordance with a further embodiment of the invention.

Referring now to FIG. 9, there is shown a block diagram illustrating the different cases of when to update the BlkInfoDirBlk and the DirBlk, in accordance with one embodiment of the invention. This first case (cases) 900 is a possible case during the system's traversing of the sections as indicated in reference block 910. In the first case (Case1) 900, the section (S) pointed by the DirEntry 901 (in a DirBlk) is the same section (S) pointed to by the FreeLstEntry 902 (in a FreeLstBlk). For this first case 900, the updates of either the BlkInfoDirBlk or DirBlk are unnecessary. In this case 900, the section 915 pointed to by the FreeLstEntry 902 is new, but the DirBlk is already updated and therefore, no update is required for the DirBlk.

The second case (case2) 903 is another possible case during the system's traversing of the sections as indicated in reference block 911. In the second case (Case2) 903, the section pointed to by the FreeLstEntry 905 is not equal to the section pointed to by the DirEntry 904 and is newer than the section pointed to by the DirEntry 904. For this case 903, the DirBlk requires an update.

The third case (case3) 906 is another possible case during the system's traversing of the sections as indicated in reference block 912. In the third case (Case3) 906, the section pointed to by the FreeLstEntry 907 is invalid (i.e., the section S1 pointed to by the DirEntry 908 is newer than the section S2 pointed to by the FreeLstEntry 907). For this case 906, the BlkInfoDirBlk needs an update. For example, the section S1's InvalidBitMap 218 (FIG. 2) in a BlkInfoDirEntry block (in BlkInfoDirBlk 216) must be set to the invalid state.

Reference is now made to both FIG. 7 and FIG. 8. As noted above, the process in FIG. 8 are the steps in task 711 (FIG. 7), where the system will compare the sections pointed to by the Section index (SecIdx) 712 and the Pba 709. Other conditions or definitions are indicated in reference block 810 for the method in FIG. 8. Note also that in FIG. 8, at the start in block 800, the system will read, from the flash memory to the cache, the section pointed by "Given", where the reference block 810 defines "Given" as the Section Pba from the FreeListEntry derived from Block Pba plus (+) the Section index. In FIG. 8, the legend "FS to CS" denotes reading from the non-volatile section (e.g., flash section) to the volatile section (e.g., cache section). If the DirEntry is not in the volatile section, then the system obtains the DirEntry from the non-volatile section. Note also that in FIG. 8, the system has already compared the Lba because FIG. 8 is a process performed in block 711. The method of FIG. 8 starts by the system reading, from cache, the section pointed by a given Section Pba from the FreeLstEntry 902 (FIG. 9) in task 800. In task 801, the logical block address (LBA) of the section being pointed by the "Given" (reference block 810) is saved as Compare LBA (CompLBA). Then in task 802, the physical block address (PBA) associated with the compare LBA (CompLBA) is read and is compared with the PBA from the DirEntry 901 (FIG. 9) in task 803. Since in task 801, the LBA (which is pointed to by FreeLstEntry 902) is saved as CompLBA, the FreeLStEntry 902 is associated with the above-mentioned PBA associated with the CompLBA. If the PBA ("given Section Pba") associated with the compare LBA (CompLBA) is equal to the PBA from the DirEntry 901, there is no need for any updates because the DirBlk is already updated as shown in case1 900 of FIG. 9. On the other hand, if the given PBA associated with the compare LBA is not equal to the PBA from the DirEntry 901, the DisplacedPba of the last section in volatile memory (e.g., cache) is set as the current displaced PBA (CurrDisplacedPba) 726 (in FIG. 7) in task 804. Therefore, in task 804, the system again reads the non-volatile memory (e.g., flashchip), obtains the previous section's Pba (which was labeled above as DisplacedPba), and saves this DisplacedPba as CurrDisplacedPba. Therefore, the CurrDisplacedPba indicates a Pba of a particular section as the system is traversing the sections read from non-volatile memory as discussed FIGS. 8 and 9.

In task 805, the system evaluates if this DisplacedPba (which the system had obtained via traversal to the previous section in non-volatile memory and had saved in CurrDisplacedPba) is equal to the Pba in the DirEntry. If in task 805, the CurrDisplacedPba is equal to the PBA from the DirEntry, then the DirBlk 904 needs to be updated in accordance with case2 903 (FIG. 9) because the section S pointed by the FreeLstEntry 905 is newer than section 920 pointed to by the Pba from the DirEntry in DirBlk 904; otherwise, the system checks if the section in non-volatile memory pointed to by the CurrDisplacedPba is clean or erased in task 806. Note also that in task 806, the CurrDisplacedPba did not yet match a Pba from the DirEntry. If this section pointed to by the CurrDisplacedPba is already clean (as shown by erased section 925), then the section pointed to by the FreeLstEntry 907 is invalid, and therefore, the BlkInfoDirBlk needs to be updated in its invalid bit map value 218 (FIG. 2) in accordance with case3 906; otherwise, this aforementioned section (pointed by the CurrDisplacedPba) is read from cache in task 807. Note that in task 806, if the CurrDisplacedPba section is clean or erased, then a criteria (case1) 908 (FIG. 9) for the system to end the search (traversal) of the sections in non-volatile memory has been satisfied (see also reference block 914). When the criteria 908 has been satisfied, the system has traversed to the erased section F (free section F), and the system will then end the search of the sections and will not update the DirBlk 908, since the system did not find any section (identified as CurrDisplacedPba section during traversal) that matched the Pba from DirEntry 908. Referring back to task 806, if the CurrDisplacedPba section is not erased, then the system performs task 807. The system reads from the volatile memory (e.g., cache) the section pointed to by the CurrDisplacedPba in task 807. The Lba from the aforementioned section is then compared with the compare LBA in task 808. If the compare LBA is not equal to the LBA from the said section, then the BlkInfoDirBlk needs to be updated. The searching for Case1 900 ends when the section pointed by the DiplacedPba is already erased as illustrated in case1 908. Furthermore, the searching for Case2 903 ends when the section pointed by the DisplacedPba is associated in a different LBA as illustrated in case2

909 because this Lba mismatch may indicate, for example, that the section contains another user data (see also reference block 916). In case2 909, the system has traversed to the last section S on the left, and the Lba of this last section is different from the Lba of the section pointed by the Pba from the FreeLstEntry 907. The system will end its search (traversal) of the sections when this mismatch of LBAs occurs in task 808.

When the free list 902 (FIG. 9) is pointing to the same section 915 as the directory entry 901, the DirBlk is already updated. Therefore, the task 803 returns a case1 900 where the DirBlk is not updated.

When the free list 905 (FIG. 9) backward traverses the previous sections S and when the Pba of the directory entry 904 at section 920 matches the CurrDisplacedPba of the free list 905, the system returns a case2 903 because the Pba of the directory is old and an update will, therefore, be required for the DirBlk. Note that the Pba (CurrDisplacedPba) of the free list 905 is displaced due to the backward traversal of the free list 905).

When the free list 907 (FIG. 9) backward traverses the previous sections S and when the CurrDisplacedPba of the free list 907 does not match the Pba of the directory entry 908 at section S1 and when the CurrDisplacedPba of the free list 907 matches an erased section 925, the system returns a case3 906 as discussed above with respect to task 806.

The system loops back from task 808 to task 804 if, in task 808, the compare LBA is equal to the LBA from the section pointed by the CurrDisplacedPba. The system performs this loop until the criteria in task 805 or task 808 is satisfied.

After the system performs the above tasks 713 and 714, the system then exits this process in FIG. 7 and returns to the main program of FIGS. 4A-4B. Tasks 401 to 405 of FIG. 4A loops until all the free list entries that are candidates for removal are determined. After this determination, the system proceeds the scanning of the FreeLstBlk from the pointer 502 up to the entry pointed to by the index 501 (right to left), to determine if the free sections are clean as shown in FIG. 5. For example in FIG. 5, after the FreeLstEntries 503 that are candidates for removal are replaced with new set of free sections 504 pointed to by FreeLstEntries, the system checks the section pointed to by the FreeLstEntry in task 406 (FIG. 4B). Then in task 407, the system verifies if the section is indeed clean or erased. If the section turns out to be dirty in task 408, the system erases this section in task 409; otherwise, the BlkInfoDirBlk power cycle recovery section of FIG. 6 is again executed in task 410. Tasks 406 to 410 will loop 415 until the section pointed to by the FreeListEntry is proven to be clean. The system then exits this process of FIGS. 4A-4B.

After the process illustrated in FIGS. 4A-4B is performed, the system proceeds with performing any processes that were interrupted during the power failure of the system.

Typically, every time the control blocks in cache become dirty, the control blocks stored in non-volatile memory are also updated. However, for very hierarchical directory structures, constant updates are inefficient as discussed above. Consequently, an embodiment of the present invention implements the following thresholds and background tasks that allow the sequences to be sufficiently adaptive to determine when these directories need to be updated, thereby minimizing directory updates. Background tasks preferably occur when the system is, for example, idle.

TABLE 1

Threshold for FreeLstBlk Update

| When to update the FreeLstBlk saved in the non-volatile memory | |
|---|---|
| [1] | Update the FreeLstBlk saved in the non-volatile memory, due to the update of FreeLstBlk in volatile memory (e.g., cache) of which it should preferably always be the same. |

In the discussion below and in other parts of this disclosure, the term "cache" can also mean other suitable types of volatile memory. Table 1 illustrates an example threshold for the FreeLstBlk update. The FreeLstBlk 500 (FIG. 5) in cache is updated when the free count threshold is reached. For example this threshold is reached when the free sections pointed to (by the FreeLstBlk) are almost empty. For example, in a 64 GB disk size, the reserved space for free sections is about 1 GB and every FreeLstEntry consumes about 4 KB; hence, there will be about 262,144 FreeLstEntry entries. If the threshold for the used free sections is 80% of 262,144, this means that there will be 209,715 write commands that occurred before an update of FreeLstBlk. The threshold can be set to other values such as approximately 75% or other threshold values. This threshold can be configured in, for example, in a firmware that is loaded in the system. Therefore, the amount of used free sections (dirty section) accumulated in cache (due to an update of FreeLstBlk in cache) will need to reach a threshold, as discussed above, before an update is performed on the FreeLstBlk saved in the non-volatile memory (e.g., flash memory).

TABLE 2

Threshold for BlkInfoDirBlk Update

| When to update the BlkInfoDirBlk saved in the non-volatile memory | |
|---|---|
| [1] | Due to the update of FreeLstBlk of which BlkInfoDirBlk is dependent. |
| [2] | The BlkInfoDirBlk in the cache is candidate for update due to lack of free BlkInfoDirBlk in the cache. |
| [3] | If the BlkInfoDirBlk in the cache is too dirty. This update is only performed during background task. |

Similarly, if the BlkInfoDirBlk is fully cached, condition [2] of Table 2 is not performed; otherwise, an update of BlkInfoDirBlk in non-volatile is performed. Otherwise stated, in condition [2], the BlkInfoDirBlk saved in the non-volatile memory is updated when there is a lack of free BlkInfoDirBlk in the cache. A cache coherency algorithm program, as known to those skilled in the art, can be used to perform the functions as stated in condition [2].

The BlkInfoDirBlk in cache is also updated in the non-volatile memory when the FreeLstBlk is updated of which the BlkInfoDirBlk is dependent as stated in condition [1].

The BlkInfoDirBlk is also updated in the non-volatile memory when condition [3] is satisfied, where a threshold value (e.g., approximate 75%) of the BlkInfoDirBlk in the cache is dirty. This update of the BlkInfoDirBlk in the non-volatile memory is preferably only performed in, e.g., the background task.

TABLE 3

Threshold for DirBlk Update

| When to update the DirBlk saved in the non-volatile memory | |
|---|---|
| [1] | Due to the update of FreeLstBlk of which DirBlk is dependent. |
| [2] | The DirBlk in the cache is candidate for update due to lack of free DirBlk in the cache. |
| [3] | if the DirBlk in the cache is too dirty. This is only done during background task. |

Similarly, if the DirBlk is fully cached, condition [2] of Table 2 is not performed; otherwise, an update of DirBlk in non-volatile memory is performed. The DirBlk in cache is updated in non-volatile memory when the FreeLstBlk is updated of which the DirBlk is dependent as stated in condition [1]. The DirBlk is also updated when condition [3] is satisfied.

Figure 10:
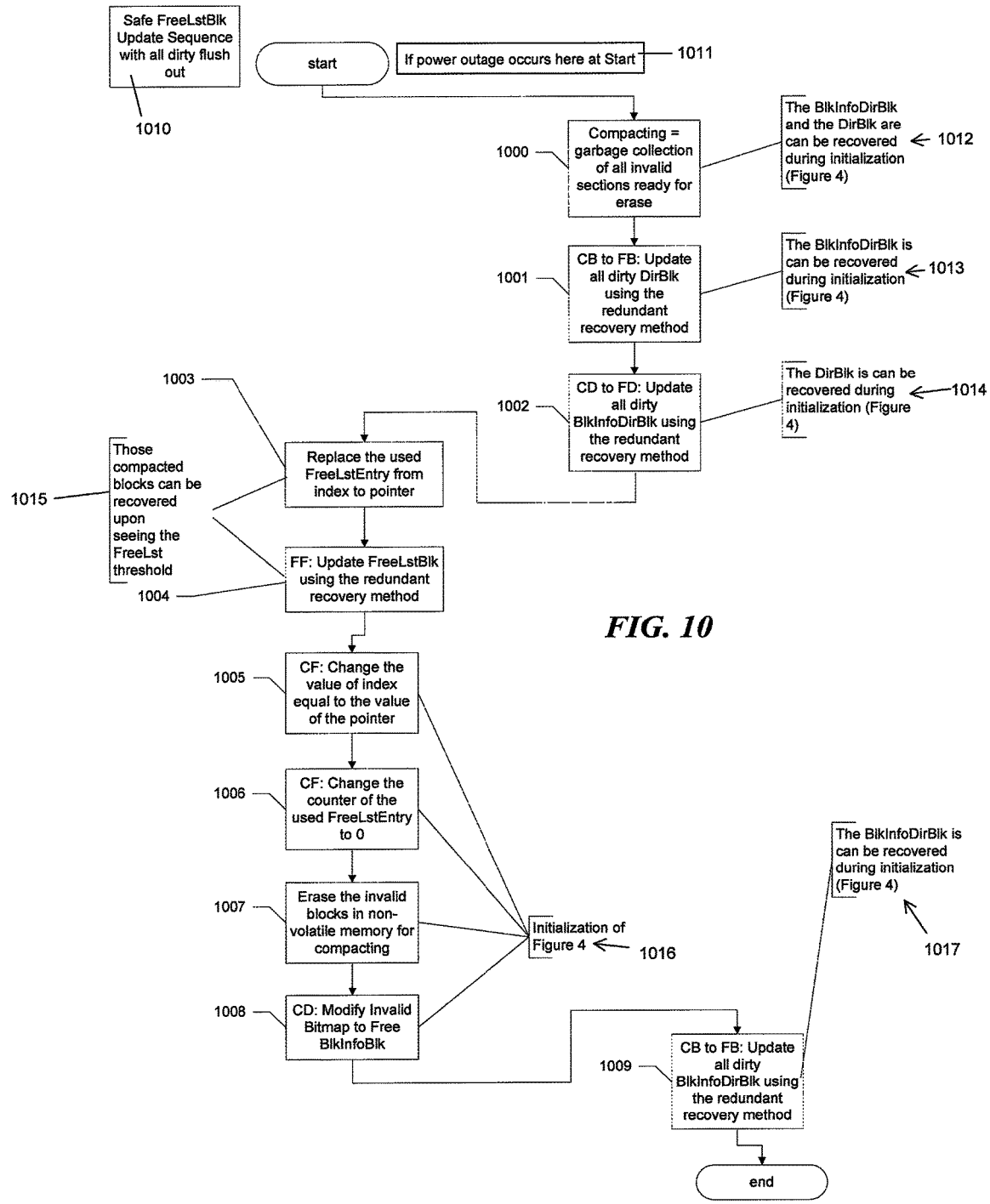
FIG. 10 is a block diagram of a normal operation update for a FreeLstBlk, in accordance with a further embodiment of the invention.

FIG. 10 is a block diagram of a normal operation update for a FreeLstBlk, in accordance with one embodiment of the invention. This FreeLstBlk update sequence and data recovery is performed during boot-up whenever the power fails during the execution of the update process. This sequence in FIG. 10 will flush out all dirty DirBlk, FreeLstBlk, and BlkInfoDirBlk blocks. Additionally, in an embodiment of the invention, when the system updates the free list block (FreeLstBlk) 203 (FIG. 2), the system will also update the directory block (DirBlk) 202 and block information directory block (BlkInfoDirBlk) 216, in order to maintain proper synchronization of these blocks and perform proper updates as discussed above. The legend "CB to FB" means cache block information to flashchip block information. The legend "CD to FD" means cache directory to flashchip directory. The legend "FF" means flashchip free list, while the legend "CF" means cache free list. First, the system collects all the invalid sections ready for erase in task 1000. Then in task 1001, all dirty DirBlk in the non-volatile memory is updated using a suitable redundant recovery method such as, for example, the redundant recovery sequence of FIG. 3. Similarly in task 1002, all dirty BlkInfoDirBlk in the non-volatile memory is updated using a suitable redundant recovery method such as, for example, the sequence of FIG. 3. Note also that other possible conditions or details are shown in at least some of the reference blocks 1010, 1011, 1012, 1013, 1014, 1015, 1016, and 1017 in the method of FIG. 10.

Figure 11:
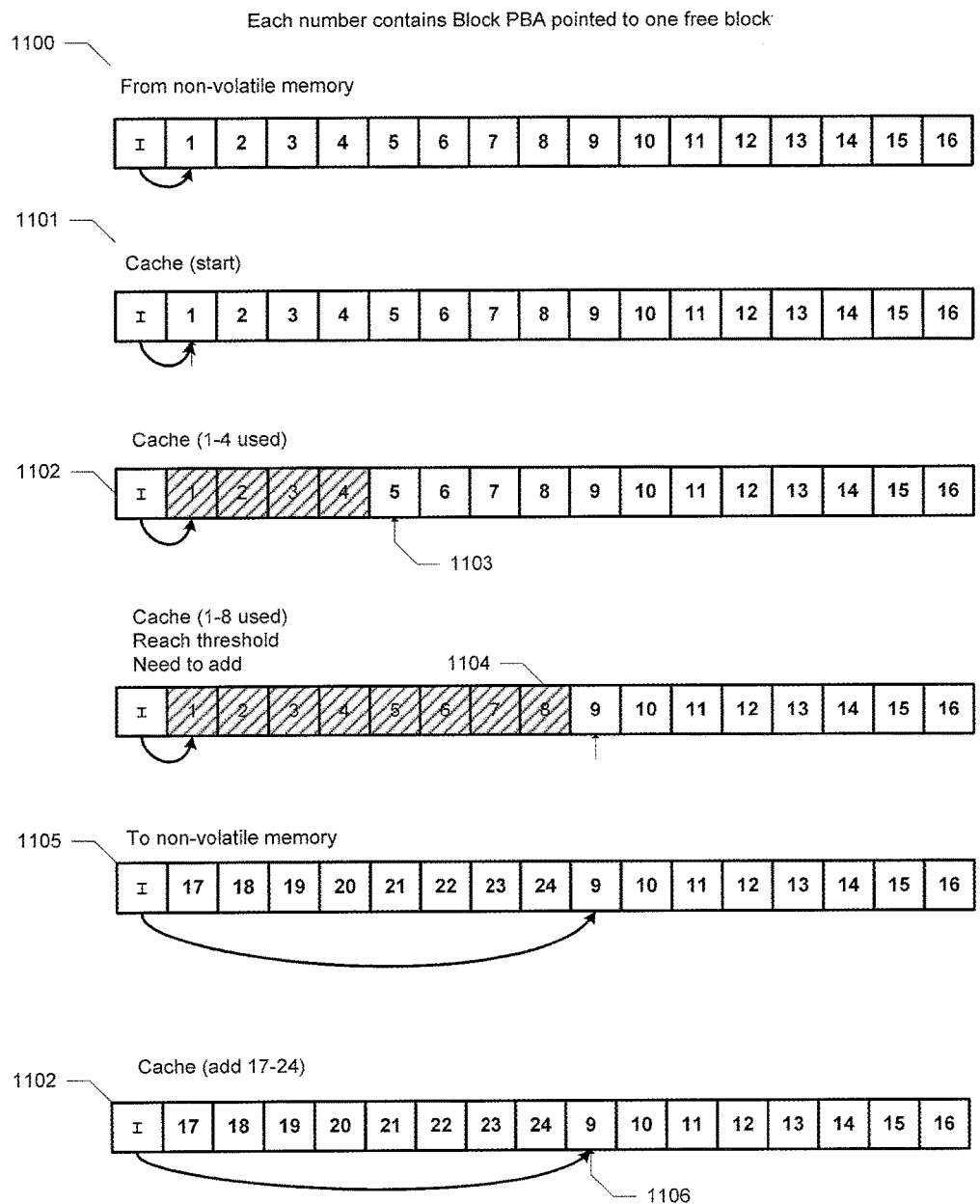
FIG. 11 is a block diagram of an itemized illustration of FreeLst update of FIG. 10, in accordance with a further embodiment of the invention.

Reference is now made to both FIG. 10 and FIG. 11. As shown, FIG. 11 is a block diagram of an itemized illustration of FreeLst update of FIG. 10, in accordance with one embodiment of the invention. In task 1003, the system replaces the used FreeLstEntries covered from the entry pointed by the index 1102 up to the FreeLstEntry before the pointer 1103 as shown in FIG. 11. However, prior to the above-replacement of the used FreeLstEntries, the FreeLstBlk in non-volatile memory 1100 is mirrored to cache 1101. In the FreeList composition of FIG. 11, each number (numeral) in the drawing contains a Block PBA pointed to one free block. Initially, the index 1102 points to the very first free FreeLstEntry 1120. As the FreeLstEntries are being used up, the pointer 1103 increments. After sometime, when the threshold 1104 (for example, eight (8) used FreeLstEntry) is reached, the aforementioned FreeLstBlk needs an update in non-volatile memory (e.g., flashchip or any other suitable type of non-volatile memory). Then in task 1004 (FIG. 10), the system updates the FreeLstBlk in the non-volatile memory using a suitable redundant recovery method such as, for example, the sequence of FIG. 3 (i.e., the FreeLstBlk in the cache is written to the non-volatile memory 1105). The value of the FreeLst index 1102 is then changed to be equal to the value of the pointer 1106 in task 1005. As shown in FIG. 11, the index 1102 and pointer 1106 have the same value of entry (9) 1125. The FreeLst counter 1102 is then set to 0 in task 1006. The system erases the invalid blocks in the non-volatile memory for compacting or garbage collection in task 1007. Furthermore in task 1008, the system sets the InvalidBitMap flag to 0, meaning the sections are set to valid. Finally in task 1009, since the BlkInfoDirBlks are modified by executing task 1008, the system updates all the dirty BlkInfoDirBlk using the redundant recovery method. The redundant recovery method is used in task 1009 so that a write is not performed in any free list sections, since writing to a free list section will affect the upstream nodes in a directory tree.

Additionally, in Task 1000, the BlkInfoDirBlk and the DirBlk can be recovered during initialization of system in FIG. 4. In Task 1001, the BlkInfoDirBlk can be recovered during initialization of system in FIG. 4. In Task 1002, the DirBlk can be recovered during initialization of system in FIG. 4. In Task 1009, the BlkInfoDirBlk can be recovered during initialization of system in FIG. 4.

FIG. 12 is a block illustration of a data relocation, in accordance with one embodiment of the invention. This drawing in FIG. 12 particularly illustrates another normal operation that performs the frequent updates of the sections. Unlike the control blocks update that uses the redundant recovery sequence of FIG. 3, the sections are updated by relocation because it is inefficient to use the aforementioned redundant method of FIG. 3 because the sections are always updated every now and then or more frequently.

Figure 13:
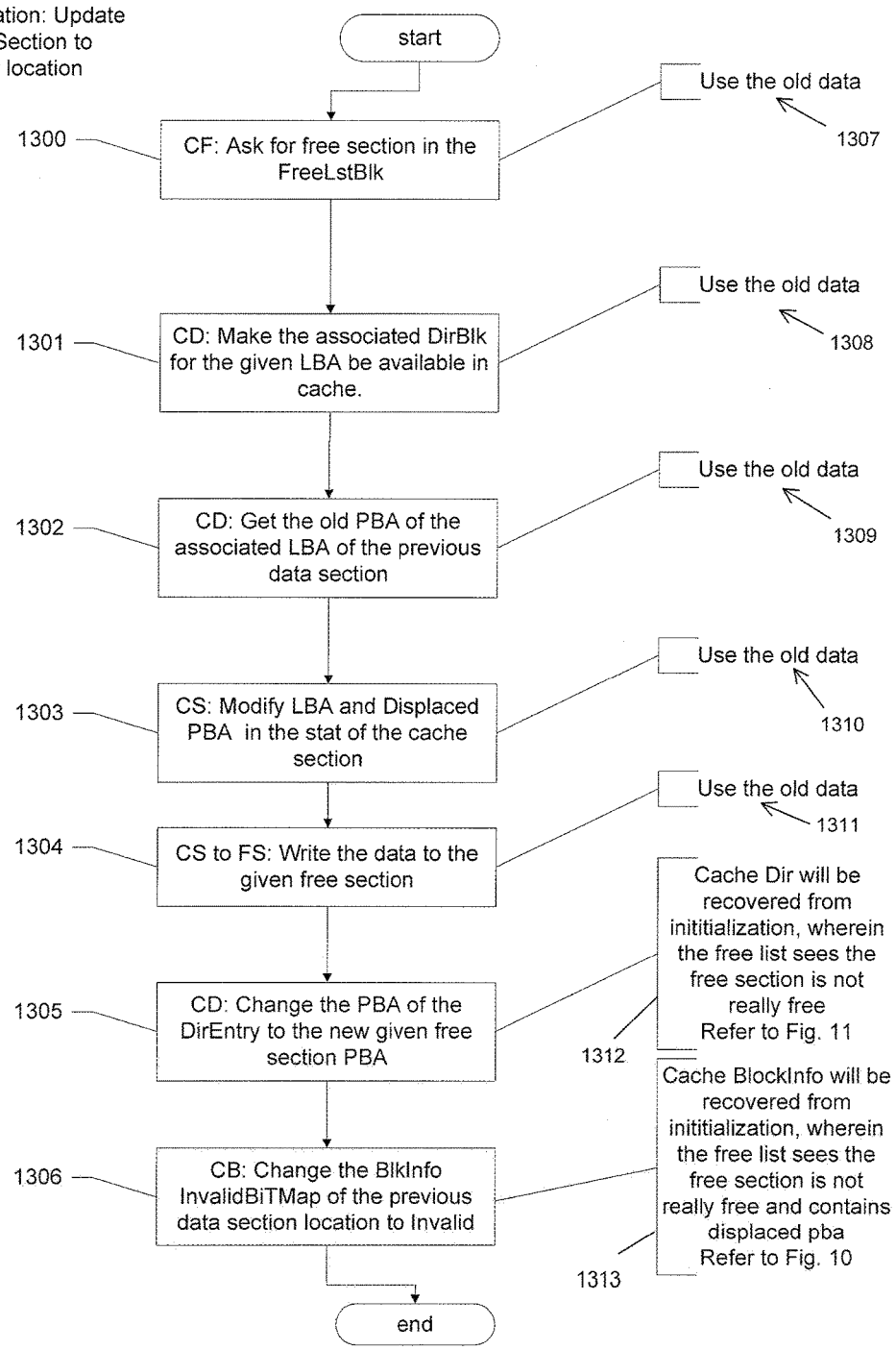
FIG. 13 is a flowchart of the data relocation process illustrated in FIG. 12, in accordance with a further embodiment of the invention.

Reference is now made to FIG. 12 and FIG. 13. As shown, FIG. 13 is a flowchart of the data relocation process illustrated in FIG. 12, in accordance with one embodiment of the invention. Also shown in FIG. 13 is the data recovery sequence whenever the power fails during the execution of the aforementioned update process. Other possible details or conditions in the method of FIG. 13 are shown in at least some of the reference blocks 1307, 1308, 1309, 1310, 1311, 1312, and 1313. First, the system in task 1300 asks for free section 1200 (FIG. 12) in the FreeLstBlk. Then in task 1301, the system makes the associated DirBlk for the given LBA by the host (non-volatile memory) to be available in cache. Prior to task 1301, this associated DirBlk is not yet in cache. However, if DirBlk is already available in cache, then there is no need to obtain this content from the non-volatile memory. Therefore, the task 1301 is already satisfied and not performed if DirBlk is already in cache.

In task 1302, the system then obtains the old PBA of the associated LBA of the previous section 1201 (shown as user section 1201 in FIG. 12A). Then in task 1303, the system modifies the LBA and the DisplacedPba in the statistics of the section in cache (i.e., the previous PBA is now equal to the DisplacedPba of the new section). Then in task 1304, in process 1210, the new data 1202 for used section 1201 is written to a free section 1200. If, for example, the power fails in the middle of writing the new data 1202 to the free section 1200, the old data in used section 1201 is still considered valid.

Note further that tasks 1300, 1301, 1302, 1303, and 1304 use information in the control blocks of the old data 1201 in order to perform the operations associated with these tasks. The information needed in old data 1201 is the Lba and the DisplacedPba.

In process 1215, after assuring that all new data 1202 has been written to free section 1200, the old used section 1201 can now be erased and marked as a new free section 1203 and now ready to carry new data (i.e., the system modifies the PBA of the DirEntry to the new given free section's PBA in task 1305; and in task 1306, the system also sets the InvaldiBitMap of the BlkInfoDirBlk of the old section to invalid). As long as a section has never been marked as free in the event of power failure, this old data will still be valid. The conversion of old sections to free sections is performed in one action so that when power fails, all sections are synchronized as either old or new. In the event of power failure occurring during this data relocation process, the redundant data recovery method is executed. Data recovery is performed during start-up in which the system will first read the content of the free sections one by one to determine whether it contains a valid data. If a free section contains a valid data it will be marked as a used section 1204.

Note that in task 1305, the DirBlk (in cache) will be recovered during the system initialization and the free list detects the free section as not actually free as shown in FIG. 11.

In task 1306, the BlkInfoDirBlk (in cache) will be recovered during the system initialization and the free list detects the free section as not actually free and contains a displaced Pba as shown in FIG. 10.

Figure 14:
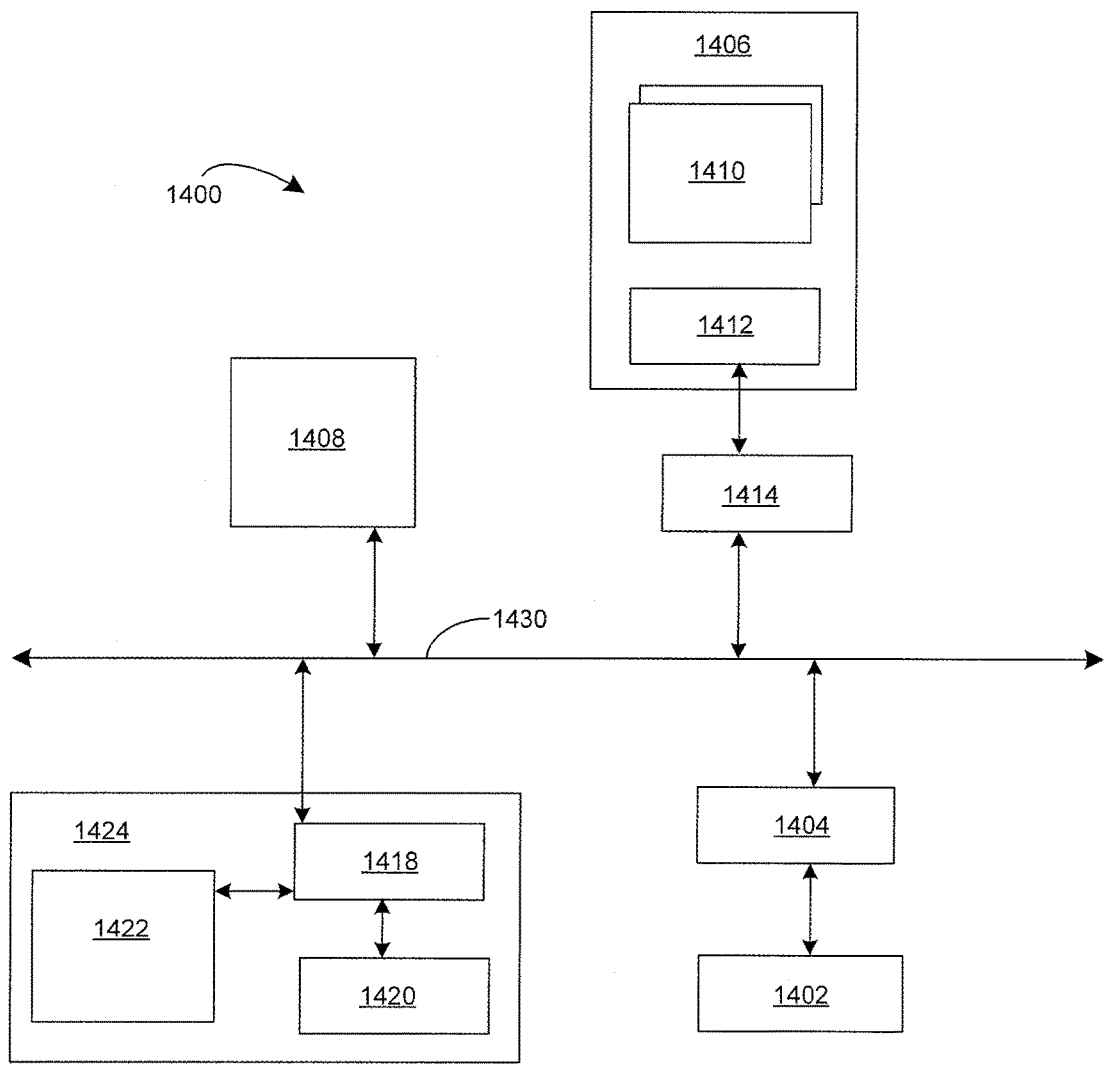
FIG. 14 is a block diagram of an example storage system (or device), in accordance with a further embodiment of the invention.

FIG. 14 is a block diagram of an example storage system (or storage device) 1400, in accordance with one embodiment of the invention. This example system 1400 is configurable to perform the data recovery functions or features described herein.

Typically, the storage device 1400 is coupled to a host 1402 through a peripheral interface 1404, such as SCSI. Fibre Channel, ATA, IDE, and/or the like, permitting the host 1402 to perform storage operations on the storage device 1400, such as write and read operations. The storage device 1400 is shown having a Memory A 1406, a Memory B 1408, a system bus, a memory bus, a local processor 1418 and associated circuitry. In addition, a Processor Circuit 1424, a Local Processor Memory 1422, a ROM 1420, and their general interaction with the storage device 1400 appear in the block diagram but are not described to avoid over-complicating the herein disclosure. Additionally, some of the elements or components in the storage device 1400 can be varied or substituted in a manner that would achieve the functions or operations described herein.

In one embodiment, the Memory A 1406 typically includes at least one bank of NAND Flash memory 1410 and a flash memory buffer circuit 1412, which is coupled to a memory controller 1414, such as, for example, a DMA controller. The Memory A 1406 is intended for use as the primary storage memory of the device 1400 and more than one set may be used to increase capacity and/or performance. In the previous discussion above, the memory 1410 is referred to as a non-volatile memory. As one example, this non-volatile memory that forms the memory 1410 is a flashchip, although this non-volatile memory may be other suitable types of memory devices. In one embodiment, one DMA controller is used for every set implemented.

The Memory B 1408 typically includes a DRAM (or its equivalents, such as SDRAM, RDRAM, etc.) and is used as a read/write ("storage") cache to Memory A 1406. In the previous discussion above, the Memory B 1408 is a volatile memory such as, for example, a cache as also referred to in the previous discussion above. The Memory B 1408 can also be other suitable types of volatile memory. The Memory B 1408 is controlled by at least one DMA memory controller (not shown) although more than one controller may be used to increase performance. Two DMA controllers (not shown) are used and provided using the local processor, which is, for example, a RISC processor having two embedded DMA controllers or other suitable processors.

The conduit between the peripheral interface 1404 is a simplified representation of a peripheral bus 1430 and may include switches, routers, and network devices but are not shown to avoid complicating the herein disclosure. For example, if the peripheral interface 1430 is implemented using a fibre channel interface, then at least one port provided by a switch would be part of the conduit between the peripheral interface and the host.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

We claim:

1. A storage apparatus, comprising:
a peripheral interface for coupling the storage apparatus to a host;
a local processor coupled to the peripheral interface;
storage media, comprising:
   cache storage coupled to the peripheral interface;
   nonvolatile memory (NVM) coupled to the peripheral interface via a memory controller coupled to the peripheral interface; and
   a local memory, accessible to the local processor the local memory includes processor executable instructions that, when executed by the local processor, cause the storage apparatus to perform operations including:
     providing, in the cache storage, a free list block comprising free list entries pointing to free list sections in the nonvolatile memory;
     scanning the free list block to identify logical free list sections containing user data, wherein a logical free list section comprises a free list section associated with a logical block address (LBA) and wherein each logical free list section containing user data requires an update of a directory block (DB) and an information directory block (IDB) associated with the logical free list section;

responsive to identifying a particular logical free list section containing user data, performing a power cycle recovery of an IDB associated with the particular logical free list section and a power cycle recovery of a DB associated with the particular logical free list section;

scanning each free list section that is pointed to by a free list entry;

responsive to identifying an unassigned free list section, performing a power cycle recovery sequence for an IDB associated with the unassigned free list section, wherein an unassigned free list section comprises a free list section not associated with an LBA; and responsive to determining that the unassigned free list section is in an invalid state, erasing the unassigned free list section.

2. The storage device of claim 1, wherein the operations include:

storing a control block comprising DBs wherein the DBs include addresses of data blocks.

3. The storage device of claim 1, wherein each free list entry points to a section in the nonvolatile memory.

4. The storage device of claim 1, wherein each free list entry includes an associated section index that points to an associated section.

5. The storage device of claim 1, wherein each free list section includes a non-volatile memory block.

6. The storage device of claim 1, wherein performing the power cycle recovery of the IDB associated with the particular logical free list section includes:

providing the IDB associated with the particular logical free list section to the cache storage, wherein a current state of the particular logical free list section is a used state;

locating, in the cache storage, an IDB entry associated with the particular logical free list section;

checking an invalid bit map flag of the IDB entry associated with the particular logical free list section; and if the invalid bit map flag does not reflect the used state of the particular logical free list section, then setting the invalid bit map flag to a value reflecting the used state of the particular logical free list section.

7. The storage device of claim 1, wherein performing the power cycle recovery of the DB associated with the particular logical free list section includes:

reading a logical block address and a displaced physical block address associated with the particular logical free list section;

determining whether user data in the particular logical free list section is error free;

responsive to determining the user data in the particular logical free list section is error free, providing the DB associated with the particular logical free list section to the cache storage;

checking a directory entry in the DB associated with the particular logical free list section, wherein the directory entry is associated with the particular logical free list section;

responsive to detecting that a physical block address in the directory entry does not match the displaced physical block address, comparing a section pointed to by a section index of an entry in a free list block and a section pointed to by the physical block address in the directory entry;

responsive to determining that the section pointed to by the section index is newer than the section pointed to by the physical block address in the directory entry, updating the DB associated with the particular logical free list section; and responsive to detecting that the section pointed to by the section index is not newer than the section pointed to by the physical block address in the directory entry, replacing the physical block address in the directory entry with the section index.

8. A power cycle recovery method, comprising:

providing, by a storage device, a free list block to cache storage, wherein the free list block includes free list entries pointing to free list sections in a nonvolatile memory;

scanning the free list block to identify logical free list sections containing user data, wherein a logical free list section comprises a free list section associated with a logical block address (LBA) and wherein each logical free list section containing user data requires an update of a directory block (DB) and an information directory block (IDB) associated with the logical free list section;

responsive to identifying a particular logical free list section containing user data, performing a power cycle recovery of an IDB associated with the particular logical free list section and a power cycle recovery of a DB associated with the particular logical free list section;

scanning each free list section that is pointed to by a free list entry;

responsive to identifying an unassigned free list section, performing a power cycle recovery sequence for an IDB associated with the unassigned free list section, wherein an unassigned free list section comprises a free list section not associated with an LBA; and responsive to determining that the unassigned free list section is in an invalid state, erasing the unassigned free list section.

9. The method of claim 8, further comprising:

storing a control block comprising DBs wherein the DBs include addresses of data blocks.

10. The method of claim 8, wherein each free list entry points to a section in the nonvolatile memory.

11. The method of claim 8, wherein each free list entry includes an associated section index that points to an associated section.

12. The method of claim 8, wherein each section includes a non-volatile memory block.

13. The method of claim 8, wherein performing the power cycle recovery of the IDB associated with the particular logical free list section includes:

providing the IDB associated with the particular logical free list section to the cache storage, wherein a current state of the particular logical free list section is a used state;

locating, in the cache storage, an IDB entry associated with the particular logical free list section;

checking an invalid bit map flag of the IDB entry associated with the particular logical free list section; and if the invalid bit map flag does not reflect the used state of the particular logical free list section, then setting the invalid bit map flag to a value reflecting the used state of the particular logical free list section.

14. The method of claim 8, wherein performing the power cycle recovery of the DB associated with the particular logical free list section includes:

reading a logical block address and a displaced physical block address associated with the particular logical free list section;

determining whether user data in the particular logical free list section is error free;

responsive to determining the user data in the particular logical free list section is error free, providing the DB associated with the particular logical free list section to the cache storage;

checking a directory entry in the DB associated with the particular logical free list section, wherein the directory entry is associated with the particular logical free list section;

responsive to detecting that a physical block address in the directory entry does not match the displaced physical block address, comparing a section pointed to by a section index of an entry in a free list block and a section pointed to by the physical block address in the directory entry;

responsive to determining that the section pointed to by the section index is newer than the section pointed to by the physical block address in the directory entry, updating the DB associated with the particular logical free list section; and responsive to detecting that the section pointed to by the section index is not newer than the section pointed to by the physical block address in the directory entry, replacing the physical block address in the directory entry with the section index.

15. An article of manufacture comprising a non-transitory computer-readable medium having stored thereon processor executable instructions, wherein the instructions, when executed by a processor cause the processor to perform operations including:

providing, by a storage device, a free list block to cache storage, wherein the free list block includes free list entries pointing to free list sections in a nonvolatile memory;

scanning the free list block to identify logical free list sections containing user data, wherein a logical free list section comprises a free list section associated with a logical block address (LBA) and wherein each logical free list section containing user data requires an update of a directory block (DB) and an information directory block (IDB) associated with the logical free list section;

responsive to identifying a particular logical free list section containing user data, performing a power cycle recovery of an IDB associated with the particular logical free list section and a power cycle recovery of a DB associated with the particular logical free list section;

scanning each free list section that is pointed to by a free list entry;

responsive to identifying an unassigned free list section, performing a power cycle recovery sequence for an IDB associated with the unassigned free list section, wherein an unassigned free list section comprises a free list section not associated with an LBA; and responsive to determining that the unassigned free list section is in an invalid state, erasing the unassigned free list section.

16. The article of manufacture of claim 15, wherein the operations include:

storing a control block comprising a directory block and wherein the directories hold addresses of data blocks.

17. The article of manufacture of claim 15, wherein each free list entry points to a section in the nonvolatile memory.

18. The article of manufacture of claim 15, wherein each free list entry includes an associated section index that points to an associated section.

\* \* \* \* \*